US010400096B2

(12) United States Patent
Peterson et al.

(10) Patent No.: US 10,400,096 B2
(45) Date of Patent: Sep. 3, 2019

(54) MODIFIED HETEROPHASIC POLYOLEFIN COMPOSITION

(71) Applicant: MILLIKEN & COMPANY, Spartanburg, SC (US)

(72) Inventors: Joseph J. Peterson, Simpsonville, SC (US); Scott R. Trenor, Greenville, SC (US); Jason D. Sprinkle, Woodruff, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 14/641,719

(22) Filed: Mar. 9, 2015

(65) Prior Publication Data
US 2015/0259453 A1 Sep. 17, 2015

Related U.S. Application Data

(60) Provisional application No. 61/953,261, filed on Mar. 14, 2014.

(51) Int. Cl.
C08F 10/06 (2006.01)
C08L 23/10 (2006.01)
C08F 299/04 (2006.01)

(52) U.S. Cl.
CPC ........ C08L 23/10 (2013.01); C08F 299/0457 (2013.01); C08F 2438/02 (2013.01)

(58) Field of Classification Search
CPC ....... C08F 10/02; C08F 10/06; C08L 2207/02
See application file for complete search history.

(56) References Cited

U.S. PATENT DOCUMENTS

| | | | |
|---|---|---|---|
| 3,301,837 A | 1/1967 | Bartorelli et al. |
| 3,376,304 A | 4/1968 | Mohrbacher et al. |
| 3,379,677 A | 4/1968 | Dressler et al. |
| 5,369,159 A | 11/1994 | Nesuadba |
| 5,428,162 A | 6/1995 | Nesuadba |
| 5,639,822 A | 6/1997 | Hungenberg et al. |
| 6,020,437 A | 2/2000 | Mestanza et al. |
| 6,620,892 B1 | 9/2003 | Bertin et al. |
| 6,992,225 B2 | 1/2006 | Grimaldi et al. |
| 7,019,086 B2 | 3/2006 | Onoi et al. |
| 7,196,144 B2 | 3/2007 | Ashiura et al. |
| 7,544,743 B2 | 6/2009 | Ciardelli et al. |
| 7,649,052 B2 | 1/2010 | Massari et al. |
| 7,772,325 B2 | 8/2010 | Ashiura et al. |
| 8,207,272 B2 | 6/2012 | Bernreitner et al. |
| 8,246,880 B2 | 8/2012 | Kawabe et al. |
| 8,557,926 B2 | 10/2013 | Kawazura et al. |
| 8,618,224 B2 | 12/2013 | Horst et al. |
| 9,410,035 B2 | 8/2016 | Peterson et al. |
| 2007/0145625 A1 | 6/2007 | Caronia et al. |
| 2007/0200272 A1 | 8/2007 | Horst et al. |
| 2010/0151156 A1 | 6/2010 | Kawabe et al. |
| 2010/0168343 A1 | 7/2010 | Harris et al. |
| 2011/0172368 A1 | 7/2011 | Stolz-Dunn |
| 2012/0289620 A1 | 11/2012 | Deheunynck et al. |

FOREIGN PATENT DOCUMENTS

| | | |
|---|---|---|
| CN | 101277997 A | 10/2008 |
| EP | 1354901 * | 4/2002 |
| EP | 1 391 482 B1 | 5/2009 |
| EP | 2 615 135 A1 | 7/2013 |
| JP | S4729439 | 11/1972 |
| WO | WO 2002/12204 A1 | 2/2002 |
| WO | WO 2007043358 A1 | 4/2007 |
| WO | WO 2010/009825 A1 | 1/2010 |
| WO | WO 2014/014491 A1 | 1/2014 |
| WO | WO 2015/138300 A1 | 9/2015 |

OTHER PUBLICATIONS

Hyslop, Macromolecules, vol. 45, p. 8147-8154 (2012).*
Hyslop et al., "Functional Nitroxyls for Use in Delayed-Onset Polyolefin Cross-Linking", *Macromolecules* 2012, 45, 8147-8154.
PCT/US2015/019410 International Search Report, filed Mar. 9, 2015, 2 pages.
PCT/US2015/019410 International Written Opinion of the International Searching Authority, International filed Mar. 9, 2015, 4 pages.
"Nucleophilic Character of Alkyl Radicals. 18.[1] Absolute Rate Constants for the Addition of Primary Alkyl Radicals to Conjugated Olefins and 1,4-Benzoquinone," *J. Org. Chem.*, vol. 44, No. 15, pp. 2674-2682 (1979).
"Calibration of very fast alkyl radical 'clock' rearrangements using nitroxides," *Pure & Appl. Chem.*, vol. 62, No. 2, pp. 213-216 (1990).
Wan, Dong et al., "*Controlling Degradation and Branching Reactions of Polypropylene by Different Heteroaromatic Ring Derivatives*" Elsevier, Polymer Degradation and Stability 97 (2012) 40-48.
Xing, Haiping et al., "*Effect of Leaving Group in Dithiocarbamates on Mediating Melt Radical Reaction During Preparing Long Chain Branched Polypropylene*" Elsevier, Polymer 53 (2012) 947-955.
Al Sagheer, Fakhreia A. et al., "*Investigation of Radiation-Grafted and Radiation-Modified N-Vinyl-2-Pyrrolidone onto Polypropylene Film*" Chemistry Department, Faculty of Science, Kuwait University. Journal of Applied Polymer Science, vol. 76, 282-289 (2000).
Khalil, Magda M. I., et al., "*Gamma-Irradiation Effects on the Thermal and Structural Characteristics of Modified, Grafted Polypropylene*" Journal of Applied Polymer Science, vol. 102, 506-515 (2006).

(Continued)

Primary Examiner — Robert C Boyle
(74) Attorney, Agent, or Firm — Robert M. Lanning

(57) ABSTRACT

A method of creating a modified heterophasic polyolefin composition is provided, whereby a polyolefin composition having at least two phases is melt mixed with a free radical generator, such as a peroxide, and a compatibilizing agent characterized by at least one nitroxide radical and at least one unsaturated bond capable of undergoing a radical addition reaction. Modified heterophasic polyolefin compositions with increased melt flow rates, impact strength, and clarity, which incorporate the compatibilizing agent, are also included within the scope of the invention.

31 Claims, 9 Drawing Sheets

(56) References Cited

OTHER PUBLICATIONS

Wan, Dong et al., "*Preparation and Characterization of Long Chain Branched Polypropylene Mediated by Different Heteroaromatic Ring Derivatives*" Elsevier, Polymer 54 (2013) 639-651.

Sun, Fangli et al., "*Solid-State Graft Polymerization of Styrene in Spherical Polypropylene Granules in the Presence of TEMPO*" Journal of Applied Polymer Science, vol. 112, 275-282 (2009).

Augier, Sylvain, et al., "*Structure and Rheology of Polypropylene with Various Architectures Prepared by Coagent-Assisted Radical Processing*" Polym Int 2010; 59: 1499-1505.

* cited by examiner

MODIFIED HETEROPHASIC POLYOLEFIN COMPOSITION

CROSS-REFERENCE TO RELATED PATENT APPLICATIONS

This application claims, pursuant to 35 U.S.C. § 119(e)(1), priority to and the benefit of the filing date of U.S. Patent Application No. 61/953,261 filed on Mar. 14, 2014, which application is hereby incorporated by reference in its entirety.

TECHNICAL FIELD OF THE INVENTION

The present invention is directed to a heterophasic polyolefin composition having an increased melt flow rate, as well as high impact strength and improved clarity. Of particular interest are modified polypropylene impact copolymers.

BACKGROUND OF THE INVENTION

The melt flow rate (MFR) of a polymer resin is a function of its molecular weight. In general, increasing the melt flow rate allows the resin to be processed at lower temperatures and to fill complex part geometries. Various prior art methods of increasing the melt flow rate involve melt-blending the resin in an extruder with a compound capable of generating free radicals, such as a peroxide. When this is done, the weight average molecular weight of the polymer is reduced and the MFR is increased. Increasing the melt flow rate by decreasing the molecular weight of the polyolefin polymer, however, has been found in many cases to have a detrimental effect on the strength of the modified polymer.

Mestanza et al.—U.S. Pat. No. 6,020,437 disclose a method of improving the rheological properties of polypropylene polymers by melt-blending the polypropylene with (a) a functional compound having at least 2 acrylate groups, (b) a thiuram sulfide compound, and (c) a compound capable of generating free radicals.

Bertin et al.—U.S. Pat. No. 6,620,892 disclose a method of modifying a polypropylene homopolymer or copolymer resin, to increase the melt flow while preserving the strength of the polymer resin, by melt-blending the resin, a stable free radical selected from nitroxyl radicals comprising at least one =N—O. group, and a peroxide compound (trigger), in the absence of a functional monomer.

Onoi et al.—U.S. Pat. No. 7,019,086, Ashiura et al.—U.S. Pat. No. 7,196,144, and Ashiura et al.—U.S. Pat. No. 7,772,325, all assigned to Yokohama Rubber Co., Ltd., disclose methods to modify an elastomer to improve its bondability, by reacting the elastomer with a compound capable of forming a stable free radical, in the presence of a free radical initiator, such as a peroxide. Examples of such stable free radical compounds include nitroxide radicals, hydrazyl radicals, aryloxy radicals and trityl radicals.

Caronia et al.—US Publication 2007/0145625 disclose a process for cross-linking a polymer after it has been formed into an article. The free-radical crosslinkable polymer is hydrocarbon-based. The free radical cross-linking agent may be selected from (i) hindered amine-derived stable organic free radicals, (ii) iniferters, (iii) organometallic compounds, (iv) aryl azooxy radicals, and (v) nitroso compounds, preferably a bis-TEMPO or 4-hydroxy-TEMPO.

Horst et al.—U.S. Pat. No. 8,618,224 B2 disclose a viscosity breaking process for polypropylene, polypropylene copolymers and polypropylene blends. The vis-breaking of the polymer is conducted, for example, in an extruder, in the presence of an initiator (e.g. peroxide) and a "chain transfer agent." Suitable chain transfer agents are thiols, disulfides, phosphorous acid esters, phosphines, organic iodides, organic chlorides, propionic acid esters, aldehydes and tertiary amines.

Pham et al.—EP 1 391 482 B1 disclose a polyolefin composition comprising a reactively modified heterophasic copolymer obtained by melt compounding the heterophasic copolymer with an organic peroxide and a bifunctionally unsaturated monomer, such a butadiene.

SUMMARY OF THE INVENTION

Heterophasic polyolefin compositions, such as polypropylene impact copolymers, provide high impact strength, especially at sub-ambient temperatures. The heterophasic polyolefin compositions are useful in a wide range of industrial and household articles, including automotive parts, appliances, caps and closures and containers. One drawback of heterophasic polyolefin compositions, in general, and polypropylene impact copolymers, in particular, however, has been their relatively low melt flow rate. Conventional methods of increasing the MFR of the polymers, such as peroxide initiated viscosity breaking techniques, dramatically reduces their impact performance.

It has been discovered that in certain heterophasic polyolefin systems the incorporation of a compatibilizing agent characterized by (i) at least one nitroxide radical or a moiety capable of producing at least one nitroxide radical while being melt mixed with the heterophasic polyolefin polymer composition; and (ii) at least one unsaturated bond capable of undergoing a radical addition reaction, can ameliorate the detrimental effect on impact strength and in some cases even improve the impact strength of heterophasic polyolefin polymers, when such polymers are subjected to viscosity breaking techniques.

The polymer compositions of interest typically have a MFR of less than 200 g/10 min. With the present invention it is possible to (i) increase the MFR, while minimizing the decrease in impact strength of the polymer composition that would normally accompany the increase in MFR and/or (ii) improve the impact strength, while maintaining or increasing the MFR. In certain embodiments of the invention it is possible to both increase the MFR and improve the impact strength of the polymer composition. Additionally, the compatibilizing agents of the subject invention have been found to dramatically increase the clarity of heterophasic polyolefin compositions.

DETAILED DESCRIPTION OF THE INVENTION

Figure 1:
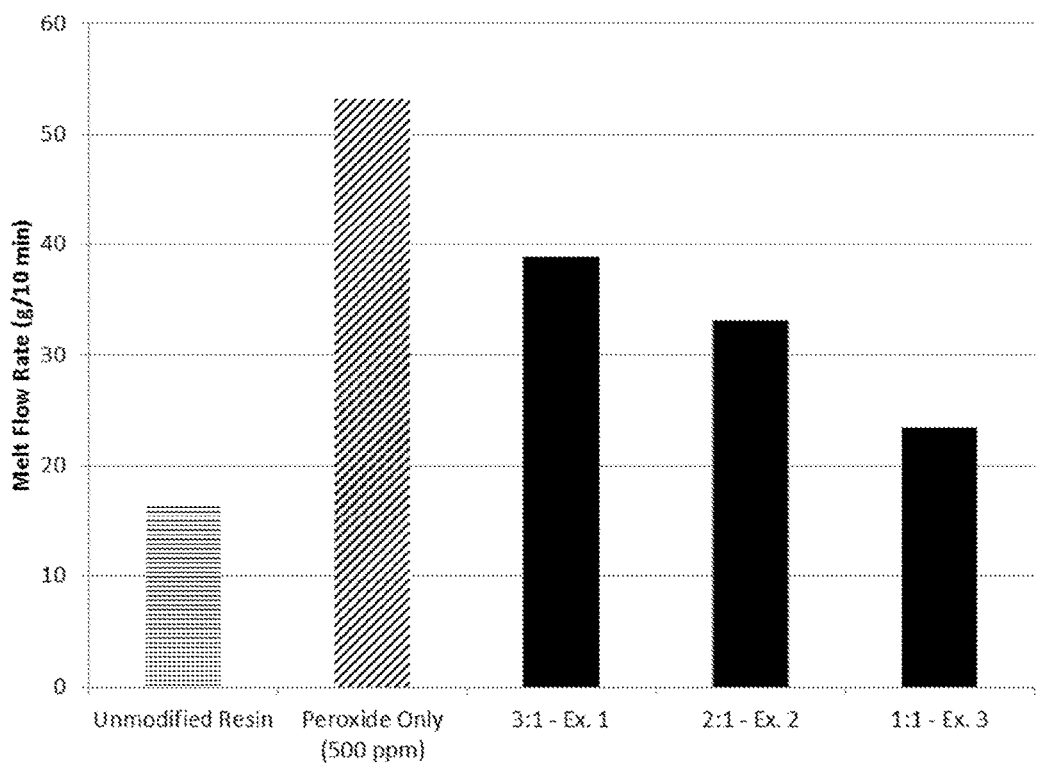
FIG. 1 is a bar chart showing the change in MFR of a propylene impact copolymer, with 500 ppm of an organic peroxide, at various loading levels of the compatibilizing agent.

Without limiting the scope of the invention, the preferred embodiments and features are hereinafter set forth. All of the United States patents, which are cited in the specification, are hereby incorporated by reference. Unless otherwise indicated, conditions are 25° C., 1 atmosphere of pressure and 50% relative humidity, concentrations are by weight, molecular weight is based on weight average molecular weight, and aliphatic hydrocarbons and radicals thereof are from one to twelve carbon atoms in length. The term "polymer" as used in the present application denotes a material having a weight average molecular weight ($M_w$) of at least 5,000. The term "copolymer" is used in its broad sense to include polymers containing two or more different monomer units, such as terpolymers, and unless otherwise indicated, includes random, block, and statistical copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers.

Polymers

The subject heterophasic polyolefin polymers that may be advantageously modified according to the present invention are characterized by at least two distinct phases—a propylene polymer phase comprising propylene polymers selected from polypropylene homopolymers and copolymers of propylene and up to 50 weight % of ethylene and/or $C_4$-$C_{10}$ α-olefins and an ethylene polymer phase comprising ethylene polymers selected from ethylene homopolymers and copolymers of ethylene and $C_3$-$C_{10}$ α-olefins. The ethylene content of the ethylene polymer phase is at least 8 weight %. When the ethylene phase is a copolymer of ethylene and $C_3$-$C_{10}$ α-olefins, the ethylene content of the ethylene phase may range from 8 to 90 weight %. In one embodiment of the invention, the ethylene content of the ethylene phase is at least 50 weight %. Either the propylene polymer phase or the ethylene polymer phase may form the continuous phase and the other will form the discrete or dispersed phase. For example, the ethylene polymer phase may be the discontinuous phase and the polypropylene polymer phase may be the continuous phase. In one embodiment of the invention, the propylene content of the propylene polymer phase is greater than the propylene content of the ethylene polymer phase.

The relative concentrations of the propylene polymer phase and the ethylene polymer phase may vary over a wide range. By way of example, the ethylene polymer phase may comprise from 5 to 80 weight % of the total of propylene polymers and ethylene polymers in the composition and the propylene polymer phase may comprise from 20 to 95 weight % of the total of propylene polymers and ethylene polymers in the composition.

In various embodiments of the invention, (i) the ethylene content may range from 5 to 75 weight %, or even 5 to 60 weight %, based on the total propylene polymer and ethylene polymer content in the heterophasic composition, (ii) the ethylene polymer phase may be an ethylene-propylene or ethylene-octene elastomer, and/or (iii) the propylene content of the propylene polymer phase may be 80 weight % or greater.

The present invention is particularly useful in modifying polypropylene impact copolymers. The impact copolymer may be characterized by a continuous phase comprising polypropylene polymers selected from polypropylene homopolymers and copolymers of propylene and up to 50 weight % of ethylene and/or $C_4$-$C_{10}$ α-olefins and a discontinuous phase comprising elastomeric ethylene polymers selected from ethylene/$C_3$-$C_{10}$ α-olefin monomers and the ethylene polymers have an ethylene content of from 8 to 90 weight %.

In various embodiments of the invention directed to propylene impact copolymers, (i) the ethylene content of the discontinuous phase may be from 8 to 80 weight %, (ii) the ethylene content of the heterophasic composition may be from 5 to 30 weight %, based on the total propylene polymers and ethylene polymers in the composition; (iii) the propylene content of the continuous phase may be 80 weight % or greater and/or (iv) the discontinuous phase may be from 5 to 35 weight % of the total propylene polymers and ethylene polymers in the composition.

Examples of heterophasic polyolefin polymers that may be modified are impact copolymers characterized by a relatively rigid, polypropylene homopolymer matrix (continuous phase) and a finely dispersed phase of ethylene-propylene rubber (EPR) particles. Polypropylene impact copolymer may be made in a two-stage process, where the polypropylene homopolymer is polymerized first and the ethylene-propylene rubber is polymerized in a second stage. Alternatively, the impact copolymer may be made in three or more stages, as is known in the art. Suitable processes may be found in the following references: U.S. Pat. Nos. 5,639,822 and 7,649,052 B2. Examples of suitable processes to make polypropylene impact copolymers are Spheripol®, Unipol®, Mitsui process, Novolen process, Spherizone®, Catalloy®, Chisso process, Innovene®, Borstar®, and Sinopec process. These processes could use heterogeneous or homogeneous Ziegler-Natta or metallocene catalysts to accomplish the polymerization.

The heterophasic polyolefin polymer composition may be formed by melt mixing two or more polymer compositions, which form at least two distinct phases in the solid state. By way of example, the heterophasic polyolefin composition may comprise three distinct phases. The heterophasic polyolefin polymer composition may result from melt mixing two or more types of recycled polyolefin compositions. Accordingly, the phrase "providing a heterophasic polyolefin polymer composition" as used herein includes employing a polyolefin polymer composition in the process that is already heterophasic, as well as melt mixing two or more polyolefin polymer compositions during the process, wherein the two or more polyolefin polymer compositions form a heterophasic system. For example, the heterophasic polyolefin polymer may be made by melt mixing a polypropylene homopolymer and an ethylene/α-olefin copolymer, such as an ethylene/butene elastomer. Examples of suitable copolymers would be Engage™, Exact®, Vistamaxx®, Versify™, INFUSE™, Nordel™, Vistalon®, Exxelor™, and Affinity™. Furthermore, it can be understood that the miscibility of the polyolefin polymer components that form the heterophasic system may vary when the composition is heated above the melting point of the continuous phase in the system, yet the system will form two or more phases when it cools and solidifies. Examples of heterophasic polyolefin polymer compositions may be found in U.S. Pat. No. 8,207,272 B2 and EP 1 391 482 B1.

In one embodiment of the invention, the heterophasic polyolefin polymer to be modified does not have any polyolefin constituents with unsaturated bonds, in particular, both the propylene polymers in the propylene phase and the ethylene polymers in the ethylene phase are free of unsaturated bonds.

In another embodiment of the invention, in addition to the propylene polymer and ethylene polymer components, the heterophasic system may include an elastomer, such as elastomeric ethylene copolymers, elastomeric propylene copolymers, styrene block copolymers, such as styrene-butadiene-styrene (SBS), styrene-ethylene-butylene-styrene (SEBS), styrene-ethylene-propylene-styrene (SEPS) and styrene-isoprene-styrene (SIS), plastomers, ethylene-propylene-diene terpolymers, LLDPE, LDPE, VLDPE, polybutadiene, polyisoprene, natural rubber, and amorphous polyolefins. The rubbers may be virgin or recycled.

Method of Processing to Form the Modified Composition

The heterophasic polyolefin polymer composition is modified by mixing the polymer composition with a compatibilizing agent in the presence of free radicals, which have been generated in the composition.

In one embodiment of the invention, the heterophasic polyolefin polymer composition is modified by melt mixing the polymer composition with a compatibilizing agent in the presence of free radicals, which have been generated in the composition. The melt mixing step is conducted under conditions such that the composition is heated to above the melting temperature of the major polyolefin component of the composition and mixed while in the molten state. Examples of suitable melt mixing processes include melt compounding, such as in an extruder, injection molding, and mixing in a Banbury mixer or kneader. By way of example, the mixture may be melt mixed at a temperature of from 160° C. to 300° C. In particular, propylene impact copolymers may be melt mixed at a temperature of from 180° C. to 290° C. The polymer composition (propylene polymer phase and ethylene polymer phase), compatibilizing agent and an organic peroxide may be melt compounded in an extruder, at a temperature above the melting temperature of all of the polyolefin polymers in the composition.

In another embodiment of the invention, the polymer may be dissolved in a solvent and the compatibilizing agent added to the polymer solution, and the radicals generated in solution. In another embodiment of the invention, the compatibilizing agent may be combined with the polymer in the solids state and free radicals could be generated during solid-state shear pulverization as described in *Macromolecules*, "Ester Functionalization of Polypropylene via Controlled Decomposition of Benzoyl Peroxide during Solid-State Shear Pulverization"—vol. 46, pp. 7834-7844 (2013).

Conventional processing equipment may be used to mix the propylene polymers, ethylene polymers and compatibilizing agent together in a single step, in the presence of free radicals that are either added to the mixture, such as an organic peroxide, or generated in-situ, such as by shear, UV light, etc. Nevertheless, it is also possible to mix various combinations of the components in multiple steps and in various sequences, and subsequently subject the mixture to conditions whereby the compatibilizing agent reacts with the polyolefin polymers, as described herein.

For example, the compatibilizing agent and/or the free radical generator (when a chemical compound is used) can be added to the polymer in the form of one or masterbatch compositions. Suitable masterbatch compositions can comprise the compatibilizing agent and/or the free radical generator in a carrier resin. The compatibilizing agent and/or the free radical generator can be present in the masterbatch composition in an amount of about 1 wt. % to about 80 wt. % based on the total weight of the composition. Any suitable carrier resin can be used in the masterbatch compositions, such as any suitable thermoplastic polymer. For example, the carrier resin for the masterbatch compositions can be a polyolefin polymer, such as a polypropylene impact copolymer, a polyethylene homopolymer, a linear low density polyethylene polymer, a polyolefin wax, or mixtures of such polymers. The carrier resin can also be a propylene polymer or an ethylene polymer that is the same as or similar to the proplylene polymer or ethylene polymer present in the heterophasic polyolefin polymer composition. Such a masterbatch composition would allow the end user to manipulate the ratio of propylene polymer(s) to ethylene polymer(s) present in the heterophasic polyolefin polymer composition. This may be preferred when the end user needs to modify the propylene to ethylene ratio of a commercial resin grade in order to achieve the desired set of properties (e.g., balance of impact and stiffness).

Compatibilizing Agents

The compatibilizing agent is an organic compound characterized by (i) at least one nitroxide radical or a moiety capable of producing at least one nitroxide radical while being melt mixed with the heterophasic polyolefin polymer composition; and (ii) at least one unsaturated bond capable of undergoing a radical addition reaction. Of particular utility are compatibilizing agents having an unsaturated carbon-carbon bond, such as a double bond.

It is believed that in the presence of a free radical, the nitroxide radical functionality of the compatibilizing agent and the unsaturated bond functionality react with and bond to the propylene polymers and the ethylene polymers present in the composition. Thus, in accordance with the method of the present invention, it is possible to provide a modified composition comprising propylene polymers bonded to ethylene polymers by the compatibilizing agent. In particular, it is believed that the nitroxide radical functionality preferentially reacts with and bonds to the propylene polymers in the composition, and the unsaturated bond functionality preferentially reacts with and bonds to the ethylene polymers in the composition. The modification accounts for the higher molecular weight components, i.e. higher than the unmodified or peroxide only modified heterophasic polyolefin composition, which have been observed when the subject compatibilizing agent is provided in the mixture. The resulting structure compensates for the downward shift in average molecular weight caused by the breaking of polymer chains, as the MFR is modified. Additionally, the presence of higher molecular weight species in the composition, comprising polypropylene polymers and ethylene polymers bonded together by the compatibilizing agent, is believed to affect the interface between the phases in the heterophasic composition, thereby dramatically improving the optical properties, as measured by clarity.

Examples of nitroxide compounds that may be used in the present invention, provided that the compounds are synthesized or modified to contain at least one unsaturated bond capable of undergoing a radical addition reaction, may be found in *Synthetic Chemistry of Stable Nitroxides*, L. B. Volodarsky et al. CRC Press, Inc. (1994). The nitroxide compound may be a 5- or 6-membered heterocyclic compound, which may incorporate the nitroxide nitrogen in the ring structure. For example, the compatibilizing agent may be based on 2,2,6,6-tetramethyl-1-piperidinyloxy (TEMPO), such as:

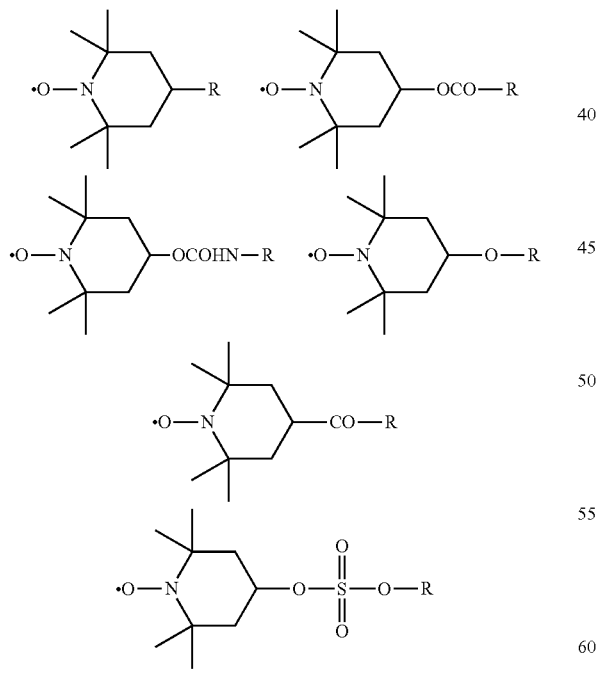

wherein R is selected from unsaturated groups capable of undergoing free-radical addition, for example an aliphatic alkenyl group or alkenyl substituted aromatic group, such as phenyl. In particular, the alkenyl group may be from $C_1$ to $C_{10}$, more preferably $C_1$ to $C_8$, $C_1$ to $C_6$, or $C_1$ to $C_4$. Specific compounds useful in the present invention are 4-Methacryloyloxy-2,2,6,6-tetramethylpiperidine-1-oxyl, ("TEMPO-Methacrylate"), 4-Acryloyloxy-2,2,6,6-tetramethylpiperidine-1-oxyl ("TEMPO-Acrylate"), 4-((4-vinylbenzyl)oxy)-2,2,6,6-tetramethylpiperidine-1-oxyl ("TEMPO-Styrene"), 4,4'-((bicyclo[2.2.1]hept-5-ene-2,3-diylbis(oxy))bis(2,2,6,6-tetramethylpiperidin-1-oxyl) ("Norbornene"), and N-tert-Butyl-α-phenylnitrone ("Nitrone").

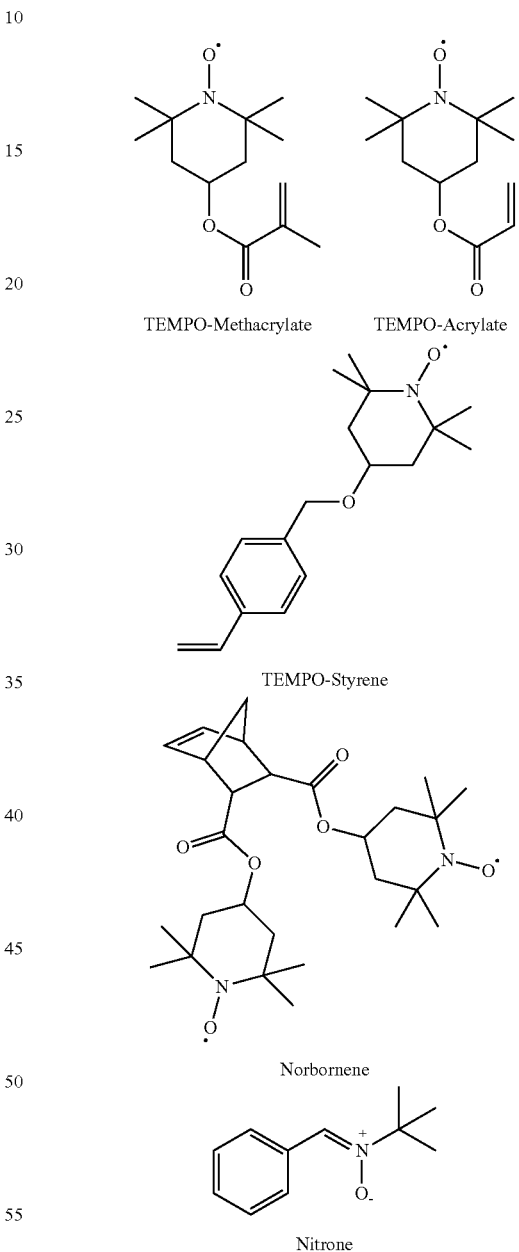

The concentration of the compatibilizing agent in the composition can be varied to meet the objectives of the end user. For example, the concentration can be varied in order to achieve a desired increase in the MFR of the polymer composition with a minimal decrease (or potentially even an increase) in the strength of the polymer, in particular the impact strength. In a preferred embodiment, the compatibilizing agent can be present in an amount of about 10 ppm or more, about 50 ppm or more, about 100 ppm or more, about 150 ppm or more, or about 200 ppm or more, based on the total weight of the polymer composition. In another preferred embodiment, the compatibilizing agent can be present in an amount of about 5 wt. % (50,000 ppm) or less, about 4 wt. % (40,000 ppm) or less, about 3 wt. % (30,000 ppm) or less, about 2 wt. % (20,000 ppm) or less, about 1 wt. % (10,000 ppm) or less, or about 0.5 wt. % (5,000 ppm) or less, based on the total weight of the polymer composition. Thus, in certain preferred embodiments, the compatibilizing agent can be present in an amount of about 10 to about 50,000 ppm, about 100 to about 10,000 ppm, or about 200 to about 5,000 ppm, based on the total weight of the polymer composition.

When a chemical free radical generator is employed (as discussed below), the concentration of the compatibilizing agent in the polymer composition can additionally or alternatively be expressed in terms of a ratio between the amount of the compatibilizing agent and the amount of the chemical free radical generator. In order to normalize this ratio for differences in the molecular weight of compatibilizing agents and number of peroxide bonds in the chemical free radical generators, the ratio is usual expressed as a ratio of the number of moles of compatibilizing agent present in the composition to the molar equivalents of peroxide bonds (O—O bonds) present from the addition of the chemical free radical generator. Preferably, the ratio (i.e., ratio of moles of compatibilzing agent to molar equivalents of peroxide bonds) is about 1:10 or more, about 1:5 or more, about 3:10 or more, about 2:5 or more, about 1:2 or more, about 3:5 or more, about 7:10 or more, about 4:5 or more, about 9:10 or more, or about 1:1 or more. In another preferred embodiment, the ratio is about 10:1 or less, about 5:1 or less, about 10:3 or less, about 5:2 or less, about 2:1 or less, about 5:3 or less, about 10:7 or less, about 5:4 or less, about 10:9 or less, or about 1:1 or less. Thus, in a series of preferred embodiments, the compatibilizing agent can be present in the composition in a ratio of moles of compatibilizing agent to molar equivalents of peroxide bonds of about 1:10 to about 10:1, about 1:5 to about 5:1, about 1:4 to about 4:1, about 3:10 to about 10:3, about 2:5 to about 5:2, or about 1:2 to about 2:1.

Free Radical Generator

A free radical generator is employed in the present invention to cause polymer chain scission and thereby positively affect the MFR of the heterophasic polyolefin polymer composition, while generating sufficient free radicals to foster the reaction of the compatibilizing agent with the polyolefin polymers in the composition. The free radical generator may be a chemical compound, such as an organic peroxide or a bis-azo compound, or free radicals may be generated by applying ultrasound, shear, an electron beam (for example β-rays), light (for example UV light), heat and radiation (for example γ-rays and X-rays), to the reaction system, or combinations of the foregoing.

Organic peroxides having one or more O—O functionalities are of particular utility in the present invention. Examples of such organic peroxides include: 2,5-dimethyl-2,5-di(t-butylperoxy)hexane, 2,5-dimethyl-2,5-di(t-butyl peroxy)hexyne-3,3,6,6,9,9-pentamethyl-3-(ethyl acetate)-1,2,4,5-tetraoxy cyclononane, t-butyl hydroperoxide, hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide; t-butyl hydroxyethyl peroxide, di-t-amyl peroxide and 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

The organic peroxide can be present in the polymer composition in any suitable amount. The suitable amount of organic peroxide will depend upon several factors, such as the particular polymer that is used in the composition, the starting MFR of the polymer, and the desired change in the MFR of the polymer. In a preferred embodiment, the organic peroxide can be present in the polymer composition in an amount of about 10 ppm or more, about 50 ppm or more, or about 100 ppm or more, based on the total weight of the polymer composition. In another preferred embodiment, the organic peroxide can be present in the polymer composition in an amount of about 2 wt. % (20,000 ppm) or less, about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, based on the total weight of the polymer composition. Thus, in a series of preferred embodiments, the organic peroxide can be present in the polymer composition in an amount of about 10 to about 20,000 ppm, about 50 to about 5,000 ppm, about 100 to about 2,000 ppm, or about 100 to about 1,000 ppm, based on the total weight of the polymer composition. The amount of organic peroxide can also be expressed in terms of a molar ratio of the compatibilizing agent and peroxide bonds, as is described above.

Suitable bis azo compounds may also be employed as a source of free radicals. Such azo compounds are for example 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl 2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine) as free base or hydrochloride, 2,2'-azobis(2-amidinopropane) as free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}.

Other chemical compounds useful as free radical initiators include 2,3-dimethyl-2,3-diphenylbutane and sterically hindered hydroxylamine ester.

The various radical generators may be employed alone or in combination.

Additives

The heterophasic polyolefin composition of the present invention is compatible with various types of additives conventionally used in thermoplastic compositions, including stabilizers, UV absorbers, hindered-amine light stabilizers (HALS), antioxidants, flame retardants, acid neutralizers, slip agents, antiblocking agents, antistatic agents, antiscratch agents, processing aids, blowing agents, colorants, opacifiers, clarifiers, and/or nucleating agents. By way of further example, the composition may comprise fillers, such as calcium carbonate, talc, glass fibers, glass spheres, inorganic whiskers such as Hyperform® HPR-803i available from Milliken Chemical, USA, magnesium oxysulfate whiskers, calcium sulfate whiskers, calcium carbonate whiskers, mica, wollastonite, clays, such as montmorillonite, and bio-sourced or natural filler. The additives may comprise up to 75 weight % of the total components in the modified heterophasic polyolefin composition.

EXAMPLES

The following examples further illustrate the subject matter described above but, of course, should not be construed as in any way limiting the scope thereof. The following methods, unless noted, were used to determine the properties described in the following examples.

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on a Nissei HM7 7 ton injection molder having a 14 mm diameter screw. The barrel temperature of the injection molder was approximately 215 to 230° C., and the mold temperature was approximately 25° C. The resulting bars measured approximately 80 mm long, approximately 10 mm wide, and approximately 4.0 mm thick.

The melt flow rate (MFR) was determined on the pelletized compositions according to (ASTM D1238) at 230° C. with a load of 2.16 kg for polypropylene.

The notched Izod impact strength for the bars was measured according to ISO method 180/A. The notched Izod impact strength was measured at +23° C. on bars that had been conditioned at either +23° C. or −30° C.

The molecular weight distribution (MWD) as well as the weight average of said distribution, $M_w$, was determined using gel permeation chromatography (GPC), also referred to as size exclusion chromatography (SEC). All measurements were conducted by the use of the Agilent PL-GPC 220 GPC/SEC system containing (3) 300×7.5 mm PLgel 10 μm Mixed-B LS columns, a Refractive Index detector, Viscometer and 15° and 90° Light Scattering detector (at 160° C.) with trichlorobenzene inhibited with 125 ppm butylhydroxytoluene as mobile phase, a column temperature of 160° C. and a sample concentration of approx. 1 mg/ml. In the examples listed below, a 15° light scattering detector is chosen to measure concentration. Gel permeation chromatography is a separation technique in which molecules are separated on the basis of hydrodynamic molecular volume or size. With proper column calibration or by the use of molecular-weight-sensitive detectors, such as light scattering or viscometry, the molecular weight distribution and the statistical molecular weight averages can be obtained. In gel permeation chromatography, molecules pass through a column via a combination of transport into and through beads along with between beads in the column. The time required for passage of a molecule through the column is decreased with increasing molecular weight. The amount of polymer exiting the column at any given time is measured with various detectors. A more in depth description of the instrumentation and detectors can be found in the chapter titled "Composition, Molar Mass and Molar Mass Distribution" in *Characterization and Analysis of Polymers* by Ron Clavier (2008).

Xylene solubles were determined by a modified ASTM D5492-10 and are a measure of the amount of rubber present in the heterophasic polypropylene copolymers. Approximately 0.6 g of polymer was weighed out and placed into a round-bottom flask along with a stir bar. 50 mL of xylene was added to the polymer in the flask. The polymer xylene mixture was heated to reflux temperature while vigorously stirring. Once the reflux temperature was reached, the solution was stirred for an additional 30 min then cooled to room temperature. The resulting polymer/xylene mixture was gently stirred to break up any precipitated polymer gel then poured through a No. 4 filter paper, both the filtrate containing the soluble fraction and the insoluble fraction were collected. A 10 mL aliquot of the filtrate was taken with a Class A pipet and transferred into a weighed pan. The pan containing the filtrate was then placed on a temperature-controlled hot plate maintaining a temperature of 155° C. to evaporate the xylene. Once most of the xylene was evaporated, the pan was transferred to a vacuum oven set at a temperature of 80±10° C. The pressure was reduced to less than 13.3 kPa and the sample was dried for approximately 2 hours or until a constant weight was achieved. The pan mass was then subtracted giving the mass of the residual soluble polymer. The percentage of soluble polymer in the original sample was calculated as follows: $S_s = ((V_{bo}/V_{b1}) * (W_2 - W_1))/W_0) * 100$; Where: $S_s$=soluble fraction of sample, %; $V_{bo}$=original volume of solvent, mL; $V_{b1}$=volume of aliquot used for soluble determination, mL; $W_2$=mass of pan and soluble, g; $W_1$=mass of pan, g; and $W_o$=mass of original sample, g.

Examples 1-6

The following examples demonstrate the modification of a heterophasic polyolefin composition and performance enhancements achieved, according to the method of the present invention.

The compatibilizing agent was melt compounded into batches of a heterophasic polypropylene copolymer in accordance with the general formulation set forth in Table 1.

TABLE 1

| Heterophasic polypropylene copolymer formulations | |
| --- | --- |
| Component | Loading |
| Polypropylene copolymer (LyondellBasell Pro-Fax SD375S with approximately 19% xylene solubles) | Balance |

TABLE 1-continued

Heterophasic polypropylene copolymer formulations

| Component | Loading |
|---|---|
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 2 |
| Additive (Compatibilizing Agent) | See Table 2 |

Irganox ® 1010 is available from BASF
Irgafos ® 168 is available from BASF
Varox DBPH is an organic peroxide available from R.T. Vanderbilt Company Each of the compositions listed in Table 2 was mixed, extruded, and injection molded according to the above procedure. The bars were then subjected to melt flow rate and Izod impact testing described above, and evaluated using the 15° light scattering detector signal during testing by Gel Permeation Chromatography (GPC).

TABLE 2

Performance in medium-impact, heterophasic polypropylene copolymer.

| Sample | Additive | Peroxide Loading (ppm) | Additive Loading (Molar ratio O—O:Additive) | Additive Loading (ppm) | MFR (g/10 min) | RT Izod (J/m) |
|---|---|---|---|---|---|---|
| Unmodified Resin | | | | | 17 | 97 |
| Peroxide Only | | 500 | | | 53 | 52 |
| Ex. 1 | TEMPO-Methacrylate | 500 | 3:1 | 276 | 39 | 86 |
| Ex. 2 | TEMPO-Methacrylate | 500 | 2:1 | 414 | 33 | 100 |
| Ex. 3 | TEMPO-Methacrylate | 500 | 1:1 | 827 | 23 | 113 |
| Peroxide Only | | 1000 | | | 87 | 39 |
| Ex. 4 | TEMPO-Methacrylate | 1000 | 3:1 | 552 | 59 | 78 |
| Ex. 5 | TEMPO-Methacrylate | 1000 | 2:1 | 827 | 44 | 94 |
| Ex. 6 | TEMPO-Methacrylate | 1000 | 1:1 | 1655 | 28 | 115 |

Figure 2:
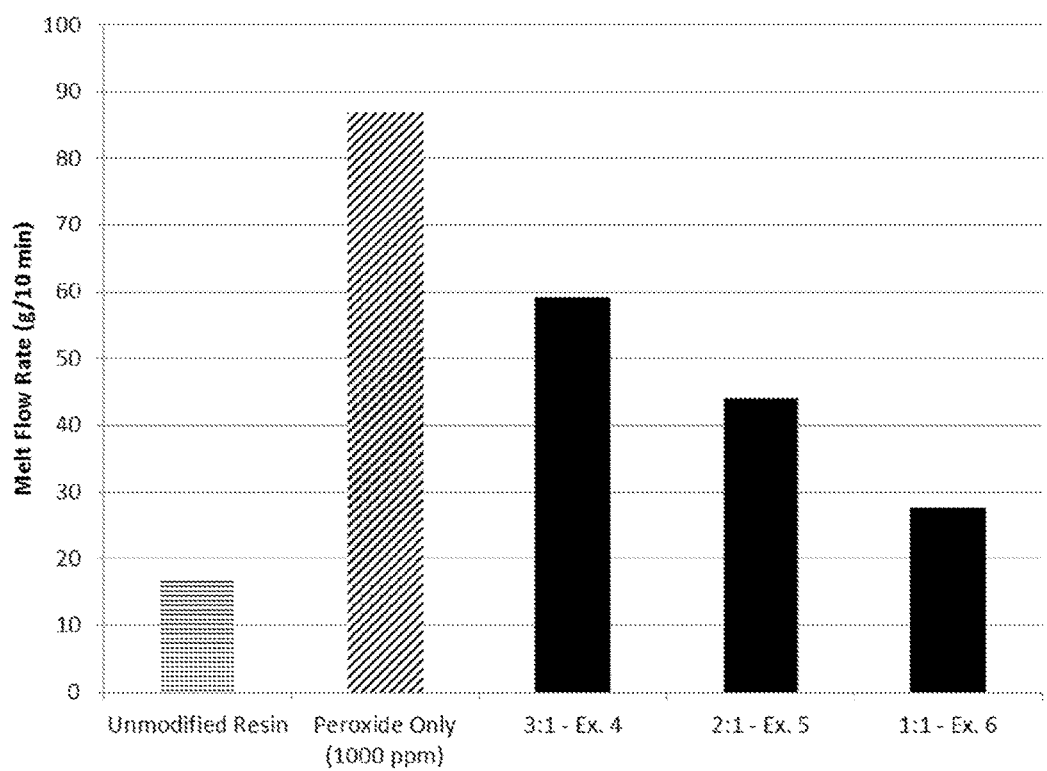
FIG. 2 is a bar chart showing the change in MFR of a propylene impact copolymer, with 1,000 ppm of an organic peroxide, at various loading levels of the compatibilizing agent.
Figure 3:
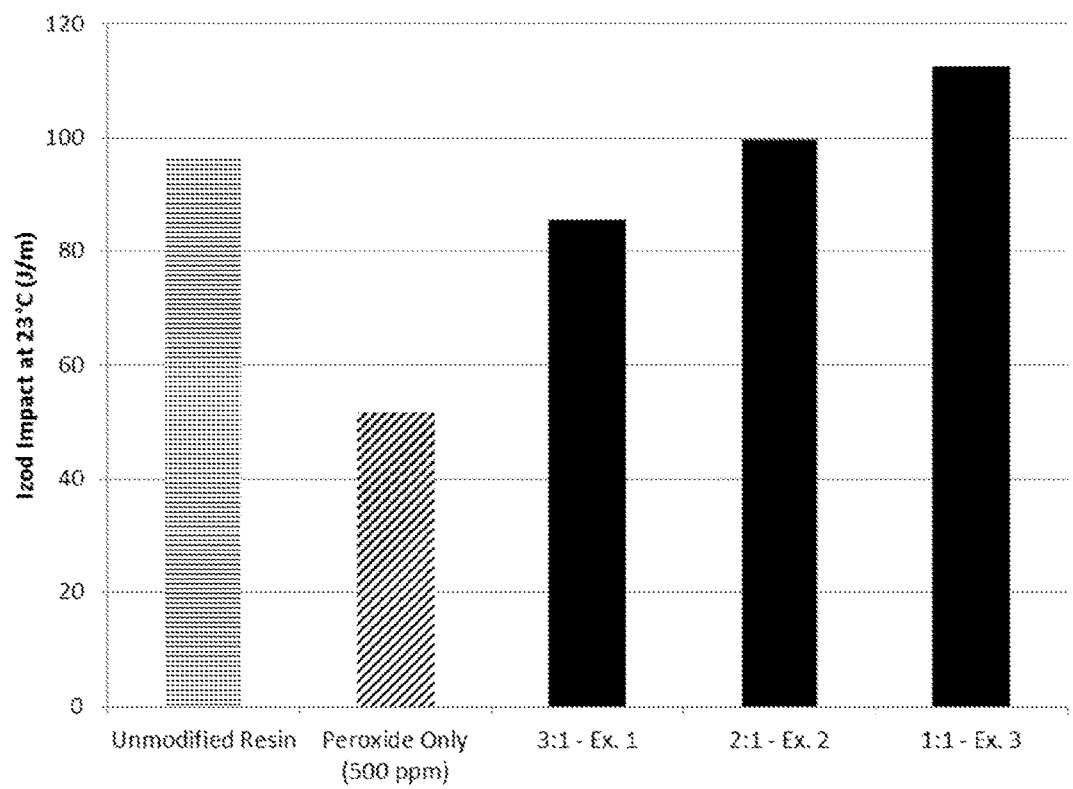
FIG. 3 is a bar chart showing the change in Izod Impact Strength (23° C.) of a propylene impact copolymer, with 500 ppm of an organic peroxide, at various loading levels of the compatibilizing agent.
Figure 4:
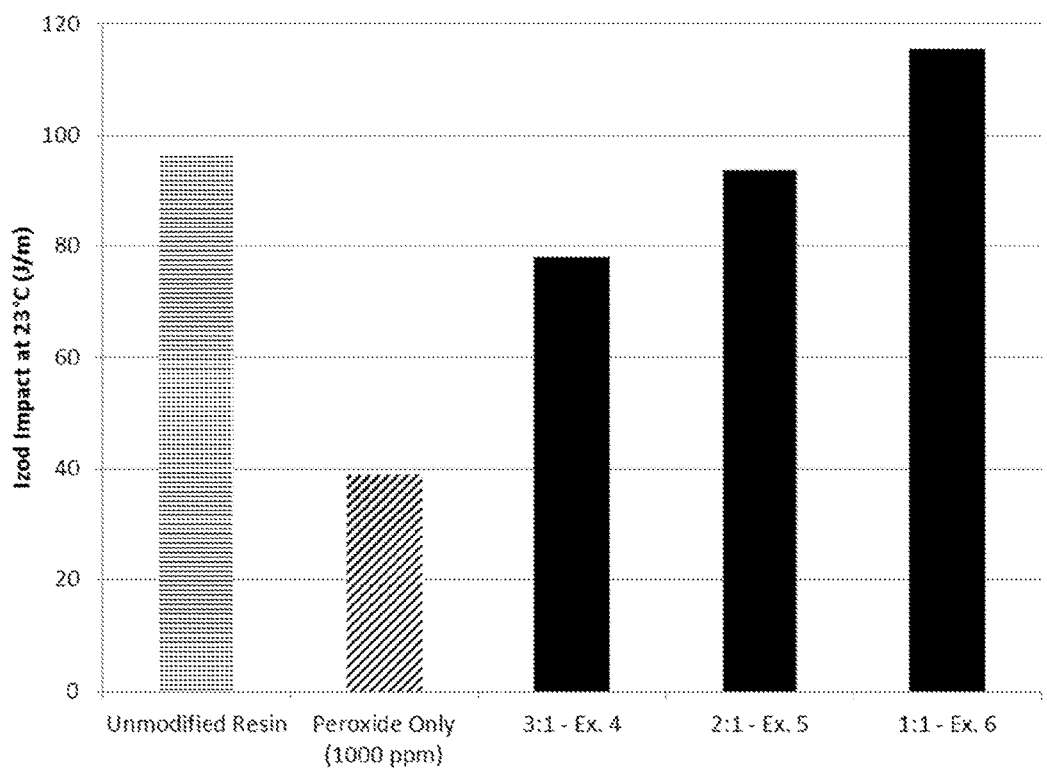
FIG. 4 is a bar chart showing the change in Izod Impact Strength (23° C.) of a propylene impact copolymer, with 1,000 ppm of an organic peroxide, at various loading levels of the compatibilizing agent.

Referring to FIG. 1, the MFR data from Table 2 for the unmodified resin, the resin with 500 ppm of the organic peroxide only and three loading levels of the compatibilizing agent (Examples 1-3) are presented in bar chart format. Referring to FIG. 2, the MFR data from Table 2 for the unmodified resin, the resin with 1,000 ppm of the organic peroxide only and three loading levels of the compatibilizing agent (Examples 4-6) are presented in bar chart format. Referring to FIG. 3, the Izod Impact Strength (23° C.) data from Table 2 for the unmodified resin, the resin with 500 ppm of the organic peroxide only and three loading levels of the compatibilizing agent (Examples 1-3) are presented in bar chart format. Referring to FIG. 4, the Izod Impact Strength (23° C.) data from Table 2 for the unmodified resin, the resin with 1,000 ppm of the organic peroxide only and three loading levels of the compatibilizing agent (Examples 4-6) are presented in bar chart format.

Comparative Examples C1-C6

The following comparative examples demonstrate the modification of a heterophasic polyolefin composition employing a nitroxide compound, which does not have an unsaturated bond capable of undergoing a radical addition reaction.

The nitroxide was melt compounded into batches of a heterophasic polypropylene copolymer in accordance with the general formulation set forth in Table 1, except that molar equivalents of 4-hydroxy-TEMPO was substituted for the compatibilizing agent, namely TEMPO-methacrylate. Each of the compositions listed in Table 3 was mixed, extruded, and injection molded according to the above procedure. The bars were then subjected to melt flow rate and Izod impact testing described above, and evaluated using the 15° light scattering detector signal during testing by Gel Permeation Chromatography (GPC).

TABLE 3

Performance in medium impact, heterophasic propylene copolymer

| Sample | Additive | Peroxide Loading (ppm) | Additive Loading (Molar ratio O—O:Additive) | Additive Loading (ppm) | MFR (g/10 min) | RT Izod (J/m) |
|---|---|---|---|---|---|---|
| Unmodified Resin | | | | | 17 | 97 |
| Peroxide Only | | 500 | | | 53 | 52 |
| Comp. C1 | 4-Hydroxy-TEMPO | 500 | 3:1 | 198 | 38 | 67 |
| Comp. C2 | 4-Hydroxy-TEMPO | 500 | 2:1 | 297 | 34 | 69 |

TABLE 3-continued

Performance in medium impact, heterophasic propylene copolymer

| Sample | Additive | Peroxide Loading (ppm) | Additive Loading (Molar ratio O—O:Additive) | Additive Loading (ppm) | MFR (g/10 min) | RT Izod (J/m) |
|---|---|---|---|---|---|---|
| Comp C3 | 4-Hydroxy-TEMPO | 500 | 1:1 | 593 | 26 | 88 |
| Peroxide Only | | 1000 | | | 87 | 39 |
| Comp. C4 | 4-Hydroxy-TEMPO | 1000 | 3:1 | 395 | 56 | 51 |
| Comp. C5 | 4-Hydroxy-TEMPO | 1000 | 2:1 | 593 | 47 | 66 |
| Comp. C6 | 4-Hydroxy-TEMPO | 1000 | 1:1 | 1186 | 27 | 87 |

Figure 5:
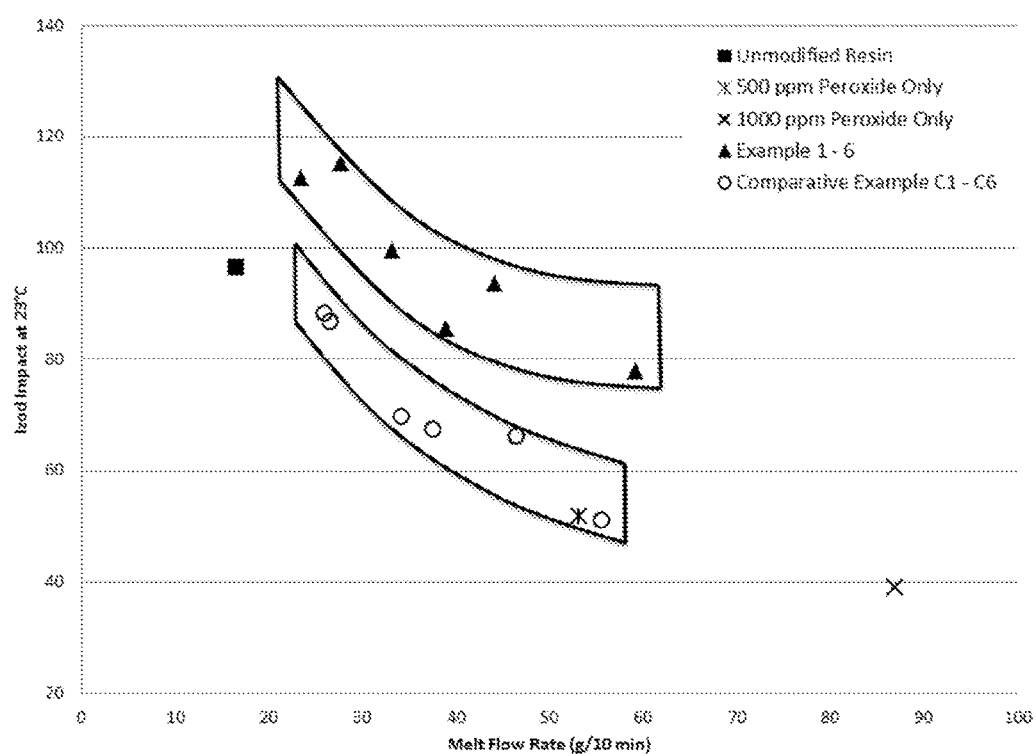
FIG. 5 is a graph of Izod Impact Strength (23° C.) versus MFR of a propylene impact copolymer, in which both Examples 1-6 and Comparative Examples C1-C6 are plotted.

The results obtained for Examples 1-6 and Comparative Examples C1-C6 are graphed together in FIG. 5, showing the change in Izod Impact Strength (23° C.) versus MFR for each of the compositions, as well as the unmodified resin and the resin containing 500 ppm and 1,000 ppm peroxide only. The comparative examples containing 4-hydroxy-TEMPO and the inventive examples containing TEMPO-methacrylate have similar melt flow rates when added at equal molar loadings. (See Ex. 1 vs. Comp. Ex. C1; Ex. 2 vs. Comp. C2; Ex. 3 vs. Comp. C3; Ex. 4 vs. Comp. C4; Ex. 5 vs. Comp. C5; and Ex. 6 vs. Comp. C6). When similar comparisons are made for Izod Impact Strength, however, the inventive examples have surprisingly higher impact strength when added at equal loadings.

As can be seen in FIG. 5, when the combined properties of MFR and Izod Impact Strength are taken into account, the compatibilizing agent of the present invention allows production of modified heterophasic polyolefin resins that occupy a distinct area on the graph from nitroxide compounds that do not include an unsaturated bond capable of undergoing a radical addition reaction. In fact, as shown in FIGS. 3-5, the method of the present invention makes it possible to provide a modified heterophasic polyolefin resin that has both improved MFR and improved Izod Impact Strength, relative to the unmodified resin.

Figure 6:
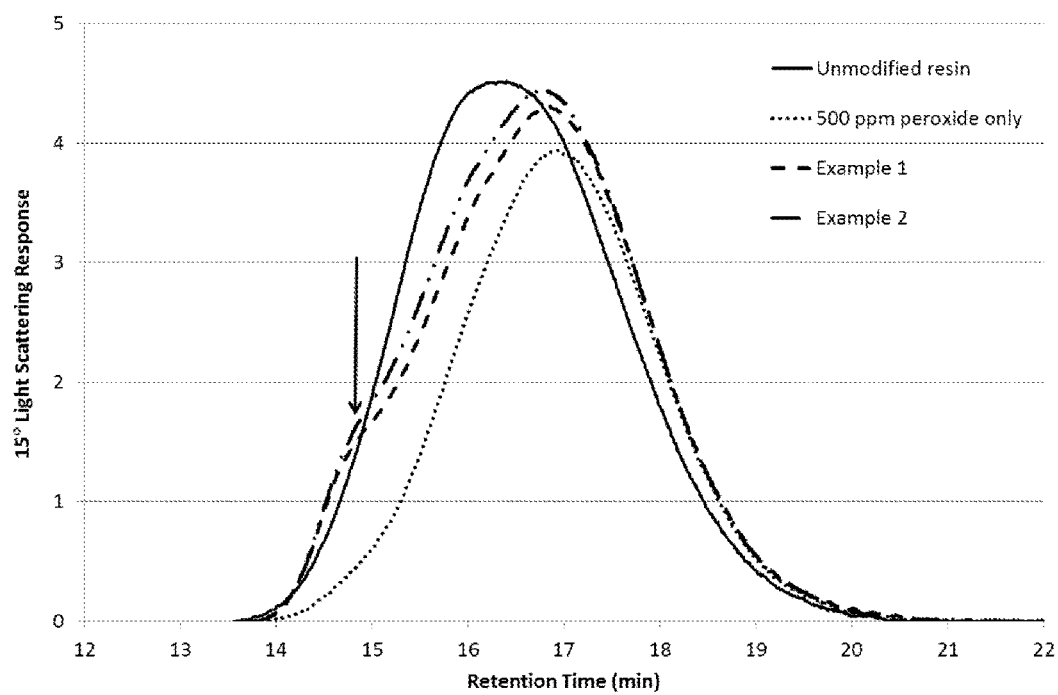
FIG. 6 is a graph of gel permeation chromatography curves indicating the molecular weight distribution (retention time increases as molecular weight decreases) for the unmodified, heterophasic polyolefin resin, the resin treated with peroxide only, and the modified resins of Examples 1 and 2.
Figure 7:
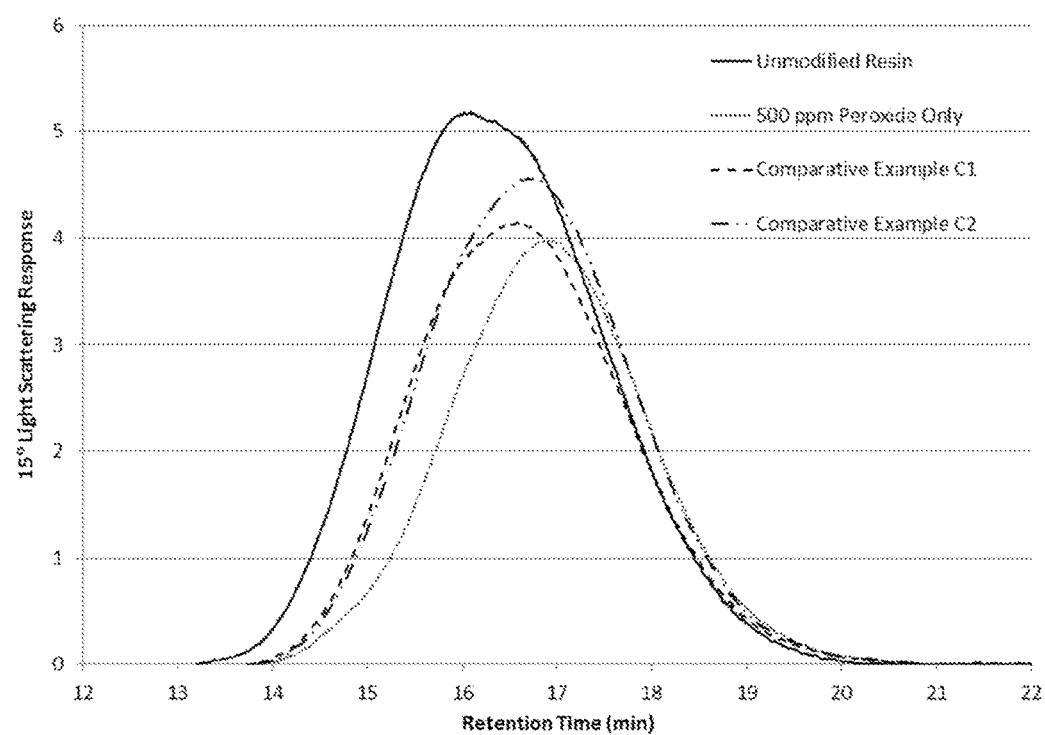
FIG. 7 is a graph of gel permeation chromatography curves indicating the molecular weight distribution (retention time increases as molecular weight decreases) for the unmodified, heterophasic polyolefin resin, the resin treated with peroxide only, and the resins of Comparative Examples C1 and C2.

The resulting change in polymer molecular weight is shown in FIG. 6, based on GPC data for the unmodified resin, resin mixed with 500 ppm of organic peroxide only and Examples 1 and 2. When peroxide is added to polypropylene, the molecular weight is decreased as indicated by the peak shift to longer retention times and there is a relative decrease in signal at retention times less than about 16 minutes. The inventive compositions show a shift back to shorter retention times (higher molecular weights) and a pronounced shoulder at a retention time of about 15 minutes, not observed in the unmodified or peroxide modified heterophasic resin. This shoulder indicates the formation of a modified polymer with molecular weight higher than that of either the unmodified or peroxide modified heterophasic resin. Referring to FIG. 7, the GPC data for Comparative Examples C1 and C2 are shown, along with the data for the unmodified resin and the resin with 500 ppm of organic peroxide only. When peroxide is added to the heterophasic impact polypropylene copolymer, the molecular weight is decreased, as indicated by the shift to longer retention times. The comparative compositions containing 4-hydroxy-TEMPO show a shift back to shorter retention times (higher molecular weights) as they counteract the peroxide but do not show the shoulder as seen with Examples 1 and 2.

Figure 8:
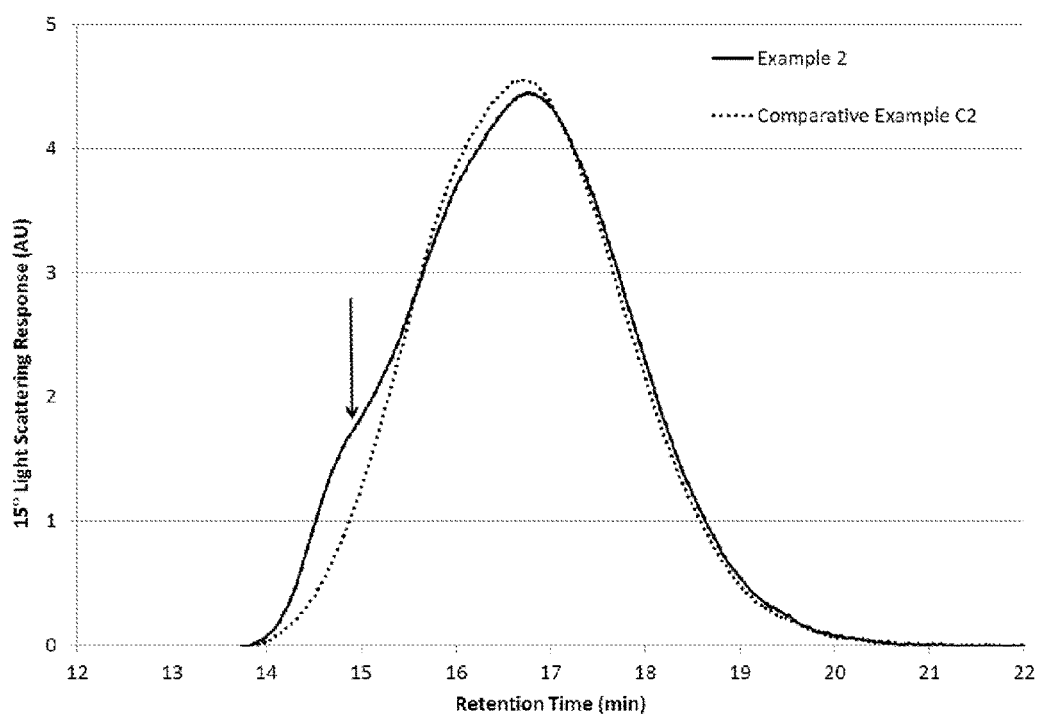
FIG. 8 is a graph of gel permeation chromatography curves indicating the molecular weight distribution (retention time increases as molecular weight decreases) for the modified heterophasic resin of Example 2 and the resin of Comparative Example 2.

FIG. 8 shows a direct comparison of inventive Example 2 (TEMPO-methacrylate) and Comparative Example C2 (4-hydroxy-TEMPO), which contain equal loadings of the peroxide and equal molar loadings of the TEMPO derivatives. The difference in the resulting polymer structure for the inventive and comparative compositions is evident. This example shows the necessity of the unsaturated bond capable of undergoing a radical addition reaction in the nitroxide based compatibilizing agent of the present invention, in order to obtain a molecular weight increase relative to the unmodified or peroxide only modified heterophasic polypropylene copolymer.

Comparative Examples C7-C8

The following examples demonstrate the combination of a compatibilizing agent meeting the specifications of the present invention (TEMPO-methacrylate), with a polypropylene homopolymer composition, which is a non-heterophasic polyolefin composition, and therefore outside of the scope of the present invention.

The comparative compounds were compounded into batches of polypropylene homopolymer compositions in accordance with the general formulation set forth in Table 4.

TABLE 4

Polypropylene homopolymer compositions.

| Component | Loading |
|---|---|
| Polypropylene homopolymer (LyondellBasell Pro-Fax HP6301) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | 500 ppm |
| Additive (Compatibilizing Agent) | See Table 5 |

Irganox ® 1010 is available from BASF
Irgafos ® 168 is available from BASF
Varox DBPH is available from R.T. Vanderbilt Company Each of the polypropylene homopolymer compositions shown in Table 5 was mixed, extruded, and pelletized according to the above procedure. The pellets were then subjected to melt flow rate and evaluated using the 15° light scattering detector signal during testing by Gel Permeation Chromatography (GPC).

TABLE 5

Performance in homopolymer polypropylene.

| Sample | Additive | Peroxide Loading (ppm) | Additive Loading (Molar ratio O—O:Additive) | Additive Loading (ppm) | MFR (g/10 min) |
|---|---|---|---|---|---|
| Unmodified Resin | | | | | 19 |
| Peroxide Only | | 500 | | | 72 |
| Comp. C7 | TEMPO-Methacrylate | 500 | 3:1 | 276 | 34 |
| Comp. C8 | TEMPO-Methacrylate | 500 | 2:1 | 414 | 27 |

Figure 9:
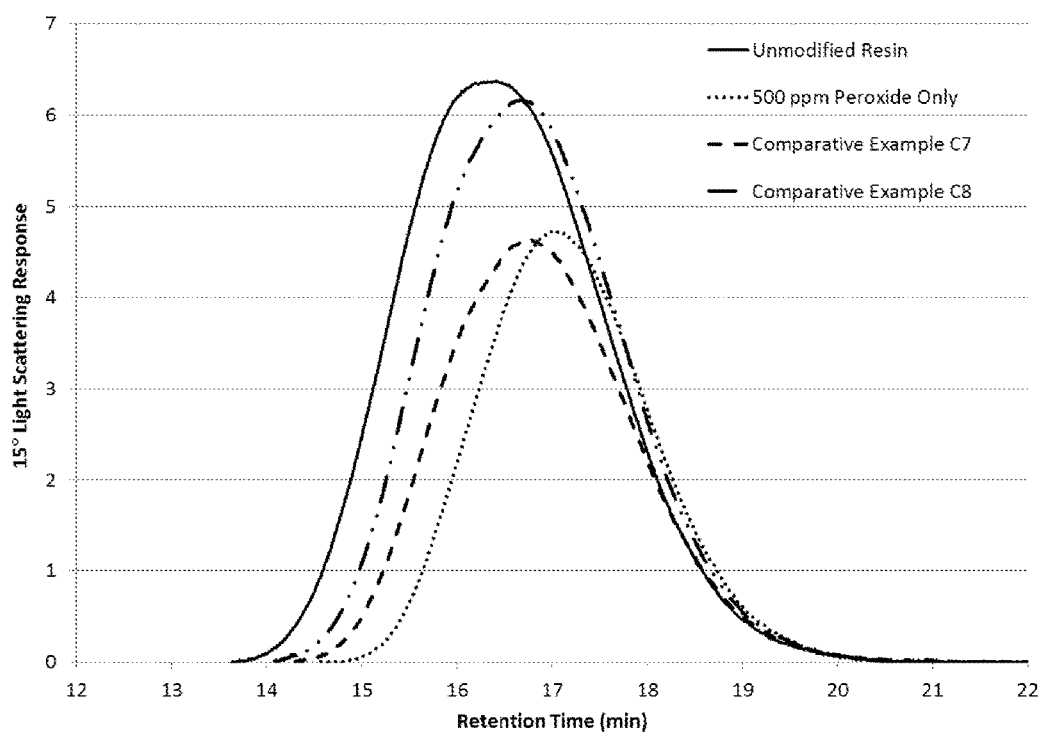
FIG. 9 is a graph of gel permeation chromatography curves indicating the molecular weight distribution (retention time increases as molecular weight decreases) for the unmodified, polypropylene (non-heterophasic) polyolefin resin, the resin treated with peroxide only, and the resins of Comparative Examples C7 and C8.

The resulting change in polymer molecular weight is shown in FIG. 9 for Comparative Examples C7-C8, along with the unmodified non-heterophasic polypropylene homopolymer resin and the resin with 500 ppm organic peroxide only. When peroxide is added to polypropylene homopolymer, the molecular weight is decreased as indicated by the shift to longer retention times. The comparative compositions containing TEMPO-methacrylate show a shift back to shorter retention times (higher molecular weights), as the TEMPO-methacrylate counteracts the peroxide, but do not show the shoulder as seen with Examples 1 and 2, thus demonstrating the necessity of the heterophasic nature of the polypropylene, to achieve the objectives of the present invention.

Examples 7-16 and Comparative Examples C9-C12

The following examples demonstrate the production of compositions and performance enhancements achieved through the incorporation of nitroxide compounds having an unsaturated bond capable of undergoing a radical addition reaction relative to nitroxide compounds that do not have an unsaturated bond. The inventive and comparative compounds were melt mixed into batches of heterophasic polypropylene copolymer compositions, in accordance with the general formulation set forth in Table 6 and the results are shown in Table 7.

TABLE 6

Polypropylene copolymer formulations

| Component | Loading |
|---|---|
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 7 |
| Additive | See Table 7 |

Irganox ® 1010 is available from BASF
Irgafos ® 168 is available from BASF
Varox DBPH is available from R. T. Vanderbilt Company Each of the heterophasic polypropylene copolymer compositions was mixed, extruded, and injection molded according to the above procedure. The bars were then subjected to melt flow rate and Izod impact testing described above. The data for the inventive examples and comparative examples are set forth in Table 7.

TABLE 7

Inventive and comparative performance

| Sample | Structure | Peroxide Loading (ppm) | Additive Loading (Molar ratio O—O Bonds: Additive) | Additive Loading (ppm) | Change in Melt Flow Rate (%) | Change in Izod impact at 23° C. (%) | Change in Izod impact at −30° C. (%) |
|---|---|---|---|---|---|---|---|
| Unmodified Resin | — | 0 | — | — | 0 | 0 | 0 |
| Peroxide Only | — | 500 | — | — | 211 | −38 | −14 |
| Peroxide Only | — | 1000 | — | — | 414 | −47 | −15 |

TABLE 7-continued

Inventive and comparative performance

| Sample | Structure | Peroxide Loading (ppm) | Additive Loading (Molar ratio O—O Bonds: Additive) | Additive Loading (ppm) | Change in Melt Flow Rate (%) | Change in Izod impact at 23° C. (%) | Change in Izod impact at −30° C. (%) |
|---|---|---|---|---|---|---|---|
| Ex. 7 | Methacrylate | 1000 | 2:1 | 820 | 225 | −1 | 9 |
| Ex. 8 | Methacrylate | 1000 | 1:1 | 1660 | 72 | 28 | 11 |
| Ex. 9 | Acrylate | 500 | 2:1 | 390 | 88 | 12 | −3 |
| Ex. 10 | Acrylate | 500 | 1:1 | 750 | 47 | 24 | −2 |

TABLE 7-continued
Inventive and comparative performance
| Sample | Structure | Peroxide Loading (ppm) | Additive Loading (Molar ratio O—O Bonds: Additive) | Additive Loading (ppm) | Change in Melt Flow Rate (%) | Change in Izod impact at 23° C. (%) | Change in Izod impact at −30° C. (%) |
|---|---|---|---|---|---|---|---|
| Ex. 11 | 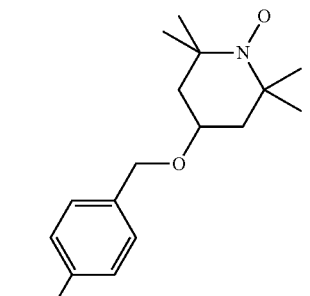 Styrene | 1000 | 2:1 | 992 | 157 | 10 | −6 |
| Ex. 12 | 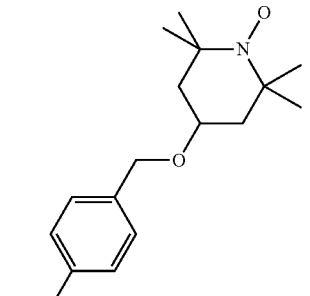 Styrene | 1000 | 1:1 | 1984 | 69 | Non-Break | 5 |
| Ex. 13 | 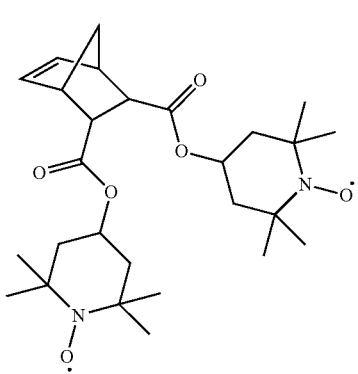 Norbornene | 1000 | 2:1 | 1688 | 158 | −3 | 7 |

TABLE 7-continued
Inventive and comparative performance
| Sample | Structure | Peroxide Loading (ppm) | Additive Loading (Molar ratio O—O Bonds: Additive) | Additive Loading (ppm) | Change in Melt Flow Rate (%) | Change in Izod impact at 23° C. (%) | Change in Izod impact at −30° C. (%) |
|---|---|---|---|---|---|---|---|
| Ex. 14 | 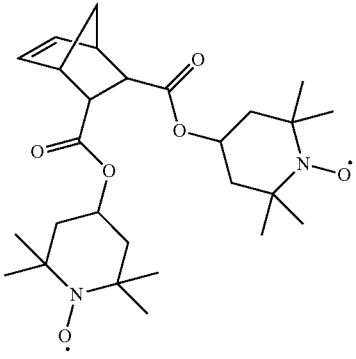 Norbornene | 1000 | 1:1 | 3380 | 48 | 49 | 18 |
| Ex. 15 | 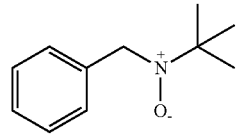 Nitrone | 1000 | 2:1 | 612 | 391 | −33 | −32 |
| Ex. 16 | 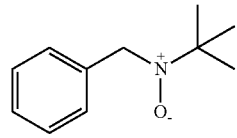 Nitrone | 1000 | 1:1 | 1220 | 313 | −17 | −19 |
| Comp. C9 | 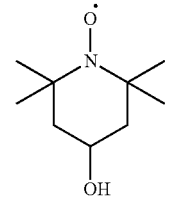 Hydroxyl | 1000 | 2:1 | 593 | 182.3 | −30.4 | −29.0 |
| Comp. C10 | 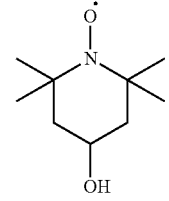 Hydroxyl | 1000 | 1:1 | 1186 | 61.1 | −8.4 | −4.6 |

TABLE 7-continued

Inventive and comparative performance

| Sample | Structure | Peroxide Loading (ppm) | Additive Loading (Molar ratio O—O Bonds: Additive) | Additive Loading (ppm) | Change in Melt Flow Rate (%) | Change in Izod impact at 23° C. (%) | Change in Izod impact at −30° C. (%) |
|---|---|---|---|---|---|---|---|
| Comp. C11 | Nitrile | 500 | 2:1 | 320 | 114 | −20 | 10 |
| Comp. C12 | Nitrile | 500 | 1:1 | 620 | 28 | −5 | −4 |

Comparative Examples C13-C24

The following comparative examples demonstrate the modification of a non-heterophasic ethylene/propylene copolymer resin with (a) nitroxide compounds having an unsaturated bond capable of undergoing a radical addition reaction (compatibilizing agents of the present invention); or (b) nitroxide compounds that do not have an unsaturated bond.

An 11 dg/min melt flow rate ethylene/propylene random copolymer polypropylene having an ethylene content of about 4.0% and marketed under the name Pro-Fax SA849S by LyondellBasell Industries was used as the base resin in the formulation as described in Table 8, below. The polyolefin composition is not heterophasic.

TABLE 8

| Component | Loading |
|---|---|
| Polypropylene random copolymer (LyondellBasell Pro-Fax SA849S) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | 500 ppm |
| Additive (Compatibilizing Agent) | See Table 9 |

Irganox ® 1010 is available from BASF
Irgafos ® 168 is available from BASF
Varox DBPH is available from R. T. Vanderbilt Company Each of the polypropylene copolymer compositions was mixed, extruded, and injection molded according to the above procedure. The bars were then subjected to melt flow rate and Izod impact testing described above. The resulting changes in melt flow rate and 23° C. Izod impact are listed in Table 9, and show clearly that absent a heterophasic polypropylene system, there is no benefit of the inventive compatibilizing agent (Comparative Examples C13-C18) over the other nitroxide compounds that do not have an unsaturated bond (Comparative Examples C19-C24) in this non-heterophasic resin type, despite the ethylene content of the resin.

TABLE 9

Compatibilizing Agent and Nitroxides with a saturated bond in a non-heterophasic polyolefin

| Sample | Additive | Peroxide Loading (ppm) | Additive Loading (Molar ratio O—O:Additive) | Additive Loading (ppm) | Change in Melt Flow Rate (%) | Change in Izod impact at 23° C. (%) |
|---|---|---|---|---|---|---|
| Unmodified Resin | | 0 | | 0 | 0.0 | 0.0 |

TABLE 9-continued

Compatibilizing Agent and Nitroxides with a saturated bond in a non-heterophasic polyolefin

| Sample | Additive | Peroxide Loading (ppm) | Additive Loading (Molar ratio O—O:Additive) | Additive Loading (ppm) | Change in Melt Flow Rate (%) | Change in Izod impact at 23° C. (%) |
|---|---|---|---|---|---|---|
| Peroxide Only | | 500 | | 0 | 315.1 | −16.8 |
| Comp. C13 | TEMPO-MA | 500 | 3:1 | 276 | 114.0 | −5.5 |
| Comp. C14 | TEMPO-MA | 500 | 2:1 | 414 | 81.3 | −5.5 |
| Comp. C15 | TEMPO-MA | 500 | 1:1 | 827 | 12.5 | 1.7 |
| Peroxide Only | | 1000 | | 0 | 645.1 | −20.9 |
| Comp. C16 | TEMPO-MA | 1000 | 3:1 | 552 | 279.0 | −10.3 |
| Comp. C17 | TEMPO-MA | 1000 | 2:1 | 827 | 183.2 | −12.9 |
| Comp. C18 | TEMPO-MA | 1000 | 1:1 | 1655 | 39.9 | 2.4 |
| Comp. C19 | 4HOTEMPO | 500 | 3:1 | 198 | 143.6 | −8.0 |
| Comp. C20 | 4HOTEMPO | 500 | 2:1 | 297 | 128.2 | −1.8 |
| Comp. C21 | 4HOTEMPO | 500 | 1:1 | 593 | 40.5 | −5.4 |
| Comp. C22 | 4HOTEMPO | 1000 | 3:1 | 395 | 316.2 | −23.0 |
| Comp. C23 | 4HOTEMPO | 1000 | 2:1 | 593 | 163.2 | 0.0 |
| Comp. C24 | 4HOTEMPO | 1000 | 1:1 | 1186 | 31.7 | 6.7 |

Example 17

The following examples demonstrate the production of a modified heterophasic polyolefin composition, created by melt mixing a polypropylene homopolymer, a polyolefin elastomer, an organic peroxide and the compatibilizing agent of the present invention. In particular, a 2 dg/min polypropylene homopolymer (Total Petrochemicals 3276), 20 w/w % of a polyolefin elastomer (Engage™ 7467 from The Dow Chemical Company), an organic peroxide (Varox DBPH available from R.T. Vanderbilt Company) and TEMPO-methacrylate (Sigma-Aldrich) were melt mixed and tested. The results were compared to the heterophasic polyolefin composition created when peroxide only was present and when neither the peroxide nor the compatibilizing agent were present.

The loadings of the initiator and TEMPO methacrylate are listed in Table 10. Each of the polymer blend compositions was mixed, extruded, and injection molded according to the above procedure. The bars were then subjected to melt flow rate and Izod impact testing described above.

The blend of the polypropylene homopolymer and the polyolefin elastomer without either the peroxide or the compatibilizing agent, exhibits non-break Izod impact behavior at 23° C., but has an undesirably low melt flow rate. When peroxide is added to the blend, the melt flow rate increases substantially, but the 23° C. Izod Impact Strength is undesirably reduced from a non-break to 83 J/m. Surprisingly, when TEMPO-methacrylate is added at a 828 ppm loading, as demonstrated in Example 17, the melt flow rate remains high, the 23° C. Izod Impact Strength exhibits non-break behavior and the −30° C. Izod impact increases significantly. The inventive Example 17 achieves a desirable balance of high melt flow rate and high Izod Impact Strength performance.

Example 18

The following examples demonstrate the production of compositions according to the invention and the performance enhancements achieved through the incorporation of TEMPO-methacrylate (Sigma-Aldrich) into certain polymer

TABLE 10

Heterophasic polyolefin composition formed during melt mixing

| Sample | Peroxide Loading (ppm) ppm | TEMPO-methacrylate Loading (Molar ratio O—O:TEMPO-methacrylate) Molar ratio O—O:TEMPO-methacrylate | TEMPO-methacrylate Loading (ppm) ppm | Melt Flow Rate (dg/min) dg/min | Izod impact at 23° C. (J/m) J/m | Izod impact at −30° C. (j/m) J/m |
|---|---|---|---|---|---|---|
| Unmodified Resin | 0 | | 0 | 2.2 | NB | 22 |
| Peroxide Only | 1000 | | 0 | 25 | 83 | 37 |
| Ex. 17 | 1500 | 3:1 | 828 | 21 | NB | 62 | blends. The polymer blends consisted of a 12 dg/min polypropylene homopolymer (LyondellBasell Pro-Fax 6301), 20 w/w % of a olefin block copolymer (INFUSE™ 9817 from The Dow Chemical Company), and optionally an peroxide (Varox DBPH) and/or TEMPO-methacrylate. The loadings of the peroxide and TEMPO-methacrylate are listed in Table 11 with the balance of the blend being the 12 dg/min polypropylene homopolymer.

TABLE 11

Polymer blend formulations

| Component | Amount |
| --- | --- |
| Polypropylene homopolymer | 500 g - Σ remaining components |
| Olefin Block Copolymer | 100.0 g |
| Primary antioxidant (Irganox ® 1010) | 0.25 g |
| Secondary antioxidant (Irgafos ® 168) | 0.5 g |
| DHT-4A | 0.2 g |
| Varox DBPH | See Table 12 |
| TEMPO-methacrylate | See Table 12 |

Irganox ® 1010 is available from BASF
Irgafos ® 168 is available from BASF
DHT-4A is available from Kyowa Chemical Industry Co., Ltd
Varox DBPH is available from R. T. Vanderbilt Company Each of the polymer blend compositions was mixed, extruded, and injection molded according to the above procedure. The bars were then subjected to melt flow rate and Izod impact testing described above. The results are reported in Table 12, below.

TABLE 12

Polymer blends using olefin block copolymers

| Sample | Peroxide Loading (ppm) ppm | TEMPO-methacrylate Loading (Molar ratio O—O:TEMPO-methacrylate) Molar ratio O—O:TEMPO-methacrylate | TEMPO-methacrylate Loading (ppm) ppm | Melt Flow Rate (dg/min) dg/min | Izod impact at 23° C. (J/m) J/m | Izod impact at −30° C. (J/m) J/m |
| --- | --- | --- | --- | --- | --- | --- |
| Unmodified Resin | 0 | | 0 | 16 | 77 | 24 |
| Peroxide Only | 500 | | 0 | 49 | 57 | 17 |
| Ex. 18 | 1000 | 2:1 | 828 | 40 | 74 | 26 |

The unmodified blend of polypropylene homopolymer and olefin block copolymer without additives has high Izod impact performance at 23° C. but an undesirably low melt flow rate. The addition of peroxide to the polymer blend increases the melt flow rate to a desirable level, but the Izod impact at 23° C. and −30° C. decrease significantly. The inventive Example 18 demonstrates that when 828 ppm of TEMPO-methacrylate is added to the composition with 1000 ppm peroxide, the melt flow rate remains at a high level and the Izod impact at 23° C. and −30° C. increases substantially.

Examples 19-24

The following examples demonstrate the production of compositions and performance enhancements achieved through the incorporation of TEMPO-methacrylate into a high-impact heterophasic polypropylene copolymer according to the invention. The resin used for these samples was an 18 MFR high-impact, heterophasic polypropylene copolymer, Pro-Fax SG702 (LyondellBasell Industries) which had approximately 25% xylene solubles. The compositions consisted of the ingredients listed in Table 13.

TABLE 13

High-impact heterophasic polypropylene copolymer

| Component | Amount |
| --- | --- |
| LyondellBasell Pro-Fax SG702 | Balance |
| Primary antioxidant (Irganox ® 1010) | 500 ppm |
| Secondary antioxidant (Irgafos ® 168) | 1000 ppm |
| Calcium stearate | 400 ppm |
| Varox DBPH | See Table 14 |
| TEMPO-methacrylate | See Table 14 |

Irganox ® 1010 is available from BASF
Irgafos ® 168 is available from BASF
Varox DBPH is available from R. T. Vanderbilt Company Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polypropylene copolymer composition was cooled in a water bath and subsequently pelletized.

The pelletized compositions were then used to form bars by injection molding the compositions on an Arburg 40 ton injection molder having a 25.4 mm diameter screw. The barrel temperature of the injection molder was approximately 200 to 220° C., and the mold temperature was approximately 25° C. The resulting bars measured approximately 127 mm long, approximately 12.7 mm wide, and approximately 3.2 mm thick. The bars were then subjected to the impact tests described below.

The notched Charpy impact strength for the bars was measured according to ASTM method D6110-10. The notched Charpy impact strength was measured at +23° C. on bars that had been conditioned at either +23° C. or −30° C. The melt flow rate (MFR) was determined according to (ASTM D1238) at 230° C. with a load of 2.16 kg for polypropylene. The resulting change in melt flow rate and Charpy impact at 23° C. and −30° C. is listed in Table 14.

TABLE 14

Performance in high-impact, heterophasic polypropylene copolymer

| Example | Peroxide Loading (ppm) | Additive Loading (Molar ratio O—O:TEMPO methacrylate) | Additive Loading (ppm) | Change in Melt Flow Rate (%) | Change in Charpy impact at 23° C. (%) | Change in Charpy impact at −30° C. (%) |
|---|---|---|---|---|---|---|
| Unmodified Resin | 0 | | | 0 | 0 | 0 |
| Peroxide Only | 500 | | | 235 | −55 | −49 |
| Peroxide Only | 1000 | | | 490 | −84 | −61 |
| Ex. 19 | 500 | 3:1 | 276 | 116 | −7 | 13 |
| Ex. 20 | 500 | 2:1 | 414 | 72 | −2 | 26 |
| Ex. 21 | 500 | 1:1 | 827 | 26 | 4 | 19 |
| Ex. 22 | 1000 | 3:1 | 552 | 170 | 4 | 14 |
| Ex. 23 | 1000 | 2:1 | 827 | 100 | 25 | 44 |
| Ex. 24 | 1000 | 1:1 | 1655 | 18 | 18 | 30 |

The compositions resulting from the addition of 500 and 1,000 ppm organic peroxide only (no compatibilizing agent) demonstrate that as the peroxide is added to the high-impact polypropylene copolymer, the melt flow rate increases significantly, but the Charpy impact at 23° C. and −30° C. decreases undesirably. The addition of TEMPO-methacrylate with 500 ppm peroxide demonstrated in inventive Examples 19-21 show how the melt flow rate can be increased with minimal decreases in Charpy impact performance at 23° C. and improved Charpy impact performance at −30° C. The use of TEMPO-methacrylate with 1000 ppm peroxide shown in inventive examples 22-24 demonstrate further increases in melt flow rate while the Charpy impact performance at 23° C. and −30° C. is also increased.

Examples 25-26

The following examples demonstrate the production of compositions and performance enhancements achieved, according to the invention, through the incorporation of TEMPO-methacrylate into a polymer blend where polypropylene homopolymer is a minority component, i.e. the discrete phase in the heterophasic composition. The polymer blends of the present invention consisted of 75 w/w % of a polyolefin elastomer (Engage™ 8842 from The Dow Chemical Company), 2 dg/min polypropylene homopolymer (Total Petrochemicals 3276), 1,000 ppm of an organic peroxide (Varox DBPH available from R.T. Vanderbilt Company) and TEMPO-methacrylate. The loadings of the peroxide and TEMPO methacrylate are listed in Table 15, with the balance of the blend being the polyolefin elastomer and polypropylene homopolymer. The results were compared to the heterophasic polyolefin composition created when peroxide only was present and when neither the peroxide nor the compatibilizing agent were present.

Each of the compositions was compounded by blending the components in a closed container for approximately one minute. The compositions were then melt compounded on a Prism TSE-16-TC co-rotating, fully intermeshing, parallel, twin-screw extruder with a 16 mm screw diameter and a length/diameter ratio of 25:1. The barrel temperature of the extruder was ramped from approximately 195° C. to approximately 215° C., and the screw speed was set at approximately 500 rpm. The extrudate (in the form of a strand) for each polyolefin blend composition was cooled in a water bath and subsequently pelletized. The pelletized compositions were then compression molded on a 12 ton Carver Press at a platen temperature of 230° C. and a holding pressure of approximately 6 tons for approximately 4 minutes into a sheet that was approximately 6" wide, 6" long, and 0.047" thick. ASTM Type IV dog bone specimens were then die cut from these compression-molded sheets. The tensile properties for the ASTM Type IV dog bones were measured according to ASTM method D638 using an MTS Q-Test-5 with a crosshead speed of 20.0 in/min.

TABLE 15

Performance of Polyolefin Blends

| Example | Peroxide Loading (ppm) | Additive Loading (Molar ratio O—O:TEMPO-Methacrylate) | Additive Loading (ppm) | Tensile Strength at Yield (MPa) | Tensile Modulus (MPa) |
|---|---|---|---|---|---|
| Unmodified Resin | — | — | — | 3.7 | 12.3 |
| Peroxide Only | 1000 | — | — | 3.7 | 19.7 |
| Ex. 25 | 1000 | 3:1 | 552 | 4.6 | 26.5 |
| Ex. 26 | 1000 | 1:1 | 1654 | 5.5 | 18.5 |

The composition comprising peroxide only (no compatibilizing agent) demonstrates that when peroxide is added to a polyolefin blend containing 75 w/w % polyolefin elastomer and the balance polypropylene homopolymer, the tensile yield strength remains unchanged and the tensile modulus increases. When TEMPO-methacrylate is added to this blend, as shown in inventive Examples 25 and 26, the tensile strength at yield increases significantly. The tensile modulus can also be increased significantly when 552 ppm of TEMPO-methacrylate is combined with 1000 ppm peroxide in the blend containing 75% polyolefin elastomer, as demonstrated in Example 25.

Example 27-30 and Comparative Examples C25-C28

The following examples demonstrate unexpected improvements in the optical properties of heterophasic impact copolymers achieved through the incorporation of the compatibilizing agents of the present invention. The inventive and comparative compounds were compounded into batches of polypropylene copolymer compositions in accordance with the general formulation set forth in Table 16.

TABLE 16

Heterophasic polypropylene copolymer formulations

| Component | Loading |
|---|---|
| Polypropylene copolymer (LyondellBasell Pro-Fax SD375S with approximately 19% xylene solubles) | Balance |
| Primary antioxidant (Irganox ® 1010) | 500 ppm |
| Secondary antioxidant (Irgafos ® 168) | 1000 ppm |
| Acid scavenger (calcium stearate) | 800 ppm |
| Peroxide (Varox DBPH) | See Table 17 |
| Additive | See Table 17 |

Irganox ® 1010 is available from BASF
Irgafos ® 168 is available from BASF
Varox DBPH is available from R. T. Vanderbilt Company Each of the heterophasic polypropylene copolymer compositions were mixed and extruded according to the above procedure. The pelletized compositions were then used to form disks by injection molding the compositions on a Nissei HM7 7 ton injection molder having a 14 mm diameter screw. The barrel temperature of the injection molder was approximately 215 to 230° C., and the mold temperature was approximately 25° C. The resulting disks measured approximately 37 mm in diameter, and 1.3 mm thick (50 mil). Clarity measurements for samples analyzed herein were provided according to ASTM D1003 using a haze meter such as a BYK-Gardner Haze-Gard Plus on the injection molded disks.

TABLE 17

Clarity performance

| Example | Additive | Peroxide Loading (ppm) | Molar ratio O—O Bonds:Additive | Clarity |
|---|---|---|---|---|
| Unmodified Resin | — | 0 | — | 11.40 |
| Peroxide Only | — | 500 | — | 6.16 |
| Peroxide Only | — | 1000 | — | 5.18 |
| Comp. C25 | 4-hydroxy-TEMPO | 500 | 3 to 1 | 6.52 |
| Comp. C26 | 4-hydroxy-TEMPO | 500 | 2 to 1 | 6.50 |
| Comp. C27 | 4-hydroxy-TEMPO | 1000 | 3 to 1 | 4.58 |
| Comp. C28 | 4-hydroxy-TEMPO | 1000 | 2 to 1 | 5.28 |
| Ex. 27 | TEMPO-methacrylate | 1000 | 3 to 1 | 24.20 |
| Ex. 28 | TEMPO-methacrylate | 1000 | 2 to 1 | 23.60 |
| Ex. 29 | TEMPO-Styrene | 1000 | 3 to 1 | 34.40 |
| Ex. 30 | TEMPO-Styrene | 1000 | 2 to 1 | 41.40 |

The foregoing examples demonstrate the changes in the optical properties of a heterophasic impact copolymer modified with the inventive nitroxide compounds having an unsaturated bond capable of undergoing a radical additional reaction, relative to a nitroxide compound without an unsaturated bond. The clarity of the unmodified impact copolymer was 11.4 and modification with peroxide only caused a decrease in clarity. Comparative Examples C25-C28 show that modification of the heterophasic polypropylene copolymer with a nitroxide that does not have the unsaturated functionality decreases the clarity further. Examples 27-30 show that nitroxides with unsaturated functionality increase clarity significantly.

Without being bound to a particular theory, it is believed that the compatibilizing agent, which has both a nitroxide functionality and an unsaturated bond capable of undergoing a radical addition reaction, is capable of reaction with molecules in both phases of a heterophasic polyolefin, thereby modifying the interface between the distinct phases. The modification results in a dramatic and unexpected increase in the clarity of the heterophasic polyolefin composition.

Example 31

The following example demonstrates the modification of a masterbatch and performance enhancements achieved in a heterophasic polyolefin composition containing the masterbatch, according to the method of the present invention.

Three modified masterbatch compositions were produced. Comparative Sample 31-MB (C.S. 31-MB) was made by melt compounding a polypropylene copolymer with a peroxide as a vis-breaking agent. Samples 31A-MB and 31-B MB were made by melting compouding the same polypropylene copolymer with a peroxide as a vis-breaking agent and 4-Methacryloyloxy-2,2,6,6-tetramethylpiperidine-1-oxyl (TEMPO-Methacrylate) as a compatibilizing agent. The general formulation for these samples is set forth in Tables 18 and 19.

TABLE 18

Modified masterbatch formulations.

| Component | Loading |
|---|---|
| Polypropylene copolymer (LyondellBasell Pro-Fax SD375S with approximately 19% xylene solubles) | Balance |
| Peroxide (Varox DBPH) | See Table 19 |
| Compatibilizing Agent (TEMPO-Methacrylate) | See Table 19 |

Each of the compositions listed in Table 18 was mixed, and extruded according to the above procedure.

TABLE 19

Modified masterbatch compositions

| | Sample | | |
|---|---|---|---|
| | C.S. 31-MB | 31A-MB | 31B-MB |
| Peroxide Loading (ppm) | 1,500 | 5,000 | 10,000 |
| Additive Loading (Molar ratio Additive:O—O) | — | 1:1 | 1:1 |
| Additive Loading (ppm) | — | 8,300 | 16,500 |

Three heterophasic polymer compositions were produced by adding the modified masterbatch compositions described above to a polypropylene copolymer. Comparative Sample 31A (C.S. 31A) was the unmodified polypropylene copolymer. Comparative Sample 31B (C.S. 31B) was made by compounding the unmodified polypropylene copolymer with Comparative Sample 31-MB (C.S. 31-MB). Sample 31A was made by compounding the same unmodified polypropylene copolymer with Sample 31A-MB, and Sample 31B was made by compounding the same unmodified polypropylene copolymer with Sample 31B-MB. The general formulation for these samples is set forth in Tables 20 and 21.

TABLE 20

Heterophasic polypropylene copolymer formulations with modified masterbatches.

| Component | Loading |
| --- | --- |
| Polypropylene copolymer (LyondellBasell Pro-Fax SD375S with approximately 19% xylene solubles) | Balance |
| C.S. 31-MB | See Table 21 |
| 31A-MB | See Table 21 |
| 31B-MB | See Table 21 |

Each of the compositions listed in Table 20 was mixed, extruded, and injection molded according to the procedures described above. The bars were then subjected to melt flow rate and Izod impact testing as described above.

TABLE 21

Performance in medium-impact, heterophasic polypropylene copolymer

| | Sample | | | |
| --- | --- | --- | --- | --- |
| | C.S. 31A | C.S. 31B | 31A | 31B |
| C.S. 31-MB (%) | — | 10 | — | — |
| 31A-MB (%) | — | — | 10 | — |
| 31B-MB (%) | — | — | — | 10 |
| Melt Flow Rate (g/10 min) | 20.7 | 22.9 | 23.2 | 22.6 |
| Izod impact at 23° C. (J/m) | 80.4 | 80.7 | 86.7 | 90.4 |

The data set forth in Table 21 demonstrate that a modified masterbatch according to the invention (e.g., a modified masterbatch made by melt compounding a heterophasic polymer with a vis-breaking agent and a compatibilizing agent) can be melt compounded into an unmodified heterophasic polymer, thereby significantly improving the impact strength of the heterophasic polymer. For example, the data for C.S. 31B show that melt compounding the vis-broken masterbatch C.S. 31-MB into the unmodified heterophasic polymer does not appreciably affect the impact strength of the polymer. By way of contrast, the data for Samples 31A and 31B show that melt compounding the unmodified heterophasic polymer with the modified masterbatch compositions Sample 31A-MB and Sample 31B-MB increases the impact strength of the polymer by as much as 12%. This is particularly valuable because it demonstrates that improved heterophasic polymer compositions can be produced without directly adding the vis-breaking agent and/or compatibilizing agent to the target heterophasic polymer. Direct addition of such additives can be difficult in certain settings, such as compounding facilities and injection molding facilities. However, such facilities routinely utilize masterbatch compositions. Therefore, such facilities could readily achieve the physical property improvements described herein through the use of a modified masterbatch composition as described above.

Example 32

The following example demonstrates the modification of a masterbatch and performance enhancements achieved in a heterophasic polyolefin composition containing the masterbatch, according to the method of the present invention. Three modified masterbatch compositions were produced. Comparative Sample 32-MB (C.S. 32-MB) was made by melt compounding a polypropylene homopolymer, an ethylene/octene elastomer, and a peroxide as a vis-breaking agent. Samples 32A-MB and 32B-MB were made by melting compounding the same polypropylene homopolymer and ethylene/octene elastomer with a peroxide as a vis-breaking agent and 4-Methacryloyloxy-2,2,6,6-tetramethyl-piperidine-1-oxyl (TEMPO-Methacrylate) as a compatibilizing agent. The general formulation for these samples is set forth in Table 22.

TABLE 22

Modified masterbatch formulations.

| Component | Loading |
| --- | --- |
| Polypropylene Homopolymer (LyondellBasell Pro-Fax 6301) | See Table 23 |
| Ethylene/Octene Elastomer (Dow Engage 8200) | See Table 23 |
| Peroxide (Varox DBPH) | See Table 23 |
| Compatibilizing Agent (TEMPO-Methacrylate) | See Table 23 |

Each of the compositions listed in Table 22 was mixed and extruded according to the above procedures described above.

TABLE 23

Modified masterbatch compositions

| | Sample | | |
| --- | --- | --- | --- |
| | C.S. 32-MB | 32A-MB | 32B-MB |
| Peroxide Loading (ppm) | 3,000 | 9,741 | 18,991 |
| Additive Loading (Molar ratio Additive:O—O) | — | 1:1 | 1:1 |
| Additive Loading (ppm) | — | 16,121 | 31,431 |
| Polypropylene Homopolymer Loading (wt %) | 49.9% | 48.7% | 47.5% |
| Ethylene/Octene Elastomer Loading (wt %) | 49.9% | 48.7% | 47.5% |

Three heterophasic polymer compositions were produced by adding the modified masterbatch compositions described above to a polypropylene copolymer. Comparative Sample 32A (C.S. 32A) was the unmodified polypropylene copolymer. Comparative Sample 32B (C.S. 32B) was made by compounding the unmodified polypropylene copolymer with Comparative Sample 32-MB (C.S. 32-MB). Sample 32A was made by compounding the same unmodified polypropylene copolymer with Sample 32A-MB, and Sample 32B was made by compounding the same unmodified polypropylene copolymer with Sample 32B-MB. The general formulation for these samples is set forth in Tables 24 and 25.

TABLE 24

Heterophasic polypropylene copolymer formulations with modified masterbatches.

| Component | Loading |
| --- | --- |
| Polypropylene copolymer (ExxonMobil PP7414) | Balance |
| C.S. 32-MB | See Table 25 |
| 32A-MB | See Table 25 |
| 32B-MB | See Table 25 |

Each of the compositions listed in Table 24 was mixed, extruded, and injection molded according to the procedures described above. The bars were then subjected to melt flow rate and Izod impact testing as described above.

TABLE 25

Performance in medium-impact, heterophasic polypropylene copolymer

| | Sample | | | |
|---|---|---|---|---|
| | C.S. 32A | C.S. 32B | 32A | 32B |
| C.S. 32-MB (%) | — | 5 | — | — |
| 32A-MB (%) | — | — | 5 | — |
| 32B-MB (%) | — | — | — | 5 |
| Melt Flow Rate (g/10 min) | 21.2 | 21.2 | 19.4 | 19.5 |
| Izod impact at 23° C. (J/m) | 90.5 | 112.54 | Partial Break | Partial Break |

The data set forth in Table 25 demonstrate that a modified masterbatch according to the invention (e.g., a modified masterbatch made by melt compounding a heterophasic polymer with a vis-breaking agent and a compatibilizing agent) can be melt compounded into an unmodified heterophasic polymer, thereby significantly improving the impact strength of the heterophasic polymer. For example, the data for C.S. 32B show that melt compounding the vis-broken masterbatch C.S. 32-MB into the unmodified heterophasic polymer does not appreciably affect the impact strength of the polymer. By way of contrast, the data for Samples 32A and 32B show that melt compounding the unmodified heterophasic polymer with the modified masterbatch compositions Sample 32A-MB and Sample 32B-MB significantly increases the impact strength of the polymer. Indeed, the impact strength of the polymer was increased to the point where the part does not completely fracture during the Izod impact test and, therefore, a value for the impact strength could not be measured. Such a result is particularly valuable because it demonstrates that improved heterophasic polymer compositions can be produced without directly adding the vis-breaking agent and/or compatibilizing agent to the target heterophasic polymer. Direct addition of such additives can be difficult in certain settings, such as compounding facilities and injection molding facilities. However, such facilities routinely utilize masterbatch compositions. Therefore, such facilities could readily achieve the physical property improvements described herein through the use of a modified masterbatch composition as described above.

Applications

The heterophasic polyolefin composition of the present invention may be used in conventional polymer processing applications, including but not limited to injection molding, thin-wall injection molding, single-screw compounding, twin-screw compounding, Banbury mixing, co-kneader mixing, two-roll milling, sheet extrusion, fiber extrusion, film extrusion, pipe extrusion, profile extrusion, extrusion coating, extrusion blow molding, injection blow molding, injection stretch blow molding, compression molding, extrusion compression molding, compression blow forming, compression stretch blow forming, thermoforming, and rotomolding. Thermoplastic polymer articles made using the thermoplastic polymer composition of the invention can be comprised of multiple layers, with one or any suitable number of the multiple layers containing a thermoplastic polymer composition of the invention. By way of example, typical end-use products include containers, packaging, automotive parts, bottles, expanded or foamed articles, appliance parts, closures, cups, furniture, housewares, battery cases, crates, pallets, films, sheet, fibers, pipe, and rotationally molded parts.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What we claim is:

1. A heterophasic polymer composition comprising (a) a propylene polymer phase comprising propylene polymers selected from the group consisting of polypropylene homopolymers and copolymers of propylene and up to 50 weight % of ethylene and/or $C_4$-$C_{10}$ α-olefin monomers, and (b) an ethylene polymer phase comprising ethylene polymers selected from the group consisting of ethylene homopolymers and copolymers of ethylene and $C_3$-$C_{10}$ α-olefin monomers, provided that the ethylene content of the ethylene polymer phase is at least 8 weight %, and further provided that the propylene content of the propylene polymer phase is greater than the propylene content of the ethylene polymer phase, and wherein the composition further comprises propylene polymers bonded to ethylene polymers by a compatibilizing agent, wherein the compatibilizing agent is selected from the group consisting of 4-((4-vinylbenzyl)oxy)-2,2,6,6-tetramethylpiperidine-1-oxyl; 4,4'-((bicyclo[2.2.1]hept-5-ene-2,3-diylbis(oxy))bis (2,2,6,6-tetramethylpiperidin-1-oxyl); N-tert-Butyl-α-phenylnitrone; and mixtures thereof.

2. The composition of claim 1, wherein the ethylene polymers are selected from the group consisting of ethylene-propylene elastomers, ethylene-butene elastomers, ethylene-hexene elastomers, ethylene-octene elastomers, and mixtures thereof.

3. The composition of claim 1, wherein the ethylene polymer comprises from 5 to 80 weight % of the heterophasic polyolefin polymer composition, based on the total weight of propylene polymers and ethylene polymers in the composition.

4. The composition of claim 1, wherein the ethylene content of the heterophasic polyolefin polymer composition is from 5 to 60 weight %, based on the total weight of propylene polymers and ethylene polymers in the composition.

5. The composition of claim 4, wherein the propylene content of the propylene polymer phase is 80 weight % or greater.

6. The composition of claim 5, wherein the ethylene polymer phase is a discontinuous phase in the heterophasic polyolefin polymer composition.

7. The composition of claim 1, wherein the unsaturated bond of the compatibilizing agent is a double bond.

8. The composition of claim 1, wherein the compatibilizing agent is selected from the group consisting of 4,4'-((bicyclo[2.2.1]hept-5-ene-2,3-diylbis(oxy))bis(2,2,6,6-tetramethylpiperidin-1-oxyl); N-tert-Butyl-α-phenylnitrone; and mixtures thereof.

9. The composition of claim 1, wherein the compatibilizing agent is present in the heterophasic polyolefin polymer composition in a concentration of from 10 ppm to 5 weight %, based on the total weight of the composition.

10. The composition of claim 1, wherein the nitroxide radical of the compatibilizing agent has reacted with and is bonded to a propylene polymer and the unsaturated bond of the compatibilizing agent has reacted with and is bonded to an ethylene polymer, and the reaction between the unsaturated bond of the compatibilizing agent and the ethylene polymer is conducted in the presence of a free radical generator.

11. The composition of claim 10, wherein the free radical generator is an organic peroxide.

12. A heterophasic polymer composition comprising a continuous phase comprising polypropylene polymers selected from the group consisting of polypropylene homopolymers and copolymers of propylene and up to 80 weight % of ethylene and/or $C_4$-$C_{10}$ α-olefins and a discontinuous phase comprising elastomeric ethylene copolymers selected from the group consisting of ethylene/$C_3$-$C_{10}$ α-olefin copolymers having an ethylene content of from 8 to 90 weight %, provided that the propylene content of the propylene polymer phase is greater than the propylene content of the ethylene polymer phase, wherein the composition further comprises propylene polymers bonded to ethylene copolymers by a compatibilizing agent, wherein the compatibilizing agent is selected from the group consisting of 4-((4-vinylbenzyl)oxy)-2,2,6,6-tetramethylpiperidine-1-oxyl; 4,4'-((bicyclo[2.2.11hept-5-ene-2,3-diylbis(oxy))bis(2,2,6,6-tetramethylpiperidin-1-oxyl); N-tert-Butyl-α-phenylnitrone; and mixtures thereof.

13. The composition of claim 12, wherein the discontinuous phase comprises from 5 to 35 weight % of the heterophasic polyolefin polymer composition, based on the weight of propylene polymers and ethylene copolymers in the composition.

14. The composition of claim 12, wherein the ethylene copolymer comprising the discontinuous phase has an ethylene content of from 8 to 80 weight %.

15. The composition of claim 12, wherein the heterophasic polyolefin polymer composition comprises from 5 to 30 weight % ethylene, based on the total weight of propylene polymers and ethylene copolymers in the composition.

16. The composition of claim 12, wherein the heterophasic polyolefin polymer composition is obtained by operating in at least two polymerization stages.

17. The composition of claim 12, wherein the propylene content of the propylene polymer phase is 80 weight % or greater.

18. The composition of claim 12, wherein the unsaturated bond of the compatibilizing agent is a double bond.

19. The composition of claim 12, wherein the compatibilizing agent is selected from the group consisting 4,4'-((bicyclo[2.2.1]hept-5-ene-2,3-diylbis(oxy))bis(2,2,6,6-tetramethylpiperidin-1-oxyl); N-tert-Butyl-α-phenylnitrone; and mixtures thereof.

20. The composition of claim 12, wherein the compatibilizing agent is present in the heterophasic polyolefin polymer composition in a concentration of from 10 ppm to 5 weight %, based on the total weight of the composition.

21. The composition of claim 20, wherein the nitroxide radical of the compatibilizing agent has reacted with and is bonded to a propylene polymer and the unsaturated bond of the compatibilizing agent has reacted with and is bonded to an ethylene polymer, and the reaction between the unsaturated bond of the compatibilizing agent and the ethylene copolymer is conducted in the presence of a free radical generator selected from the group consisting of organic peroxides incorporating one or more O—O bonds, and the compatibilizing agent is present in a molar ratio to the O—O bonds of 1:10 to 10:1.

22. A heterophasic polyolefin polymer composition obtained by the process comprising the steps of:
(a) providing a propylene polymer phase comprising propylene polymers selected from the group consisting of polypropylene homopolymers and copolymers of propylene and up to 50 weight % of ethylene and/or $C_4$-$C_{10}$ α-olefins, and an ethylene polymer phase comprising ethylene polymers selected from the group consisting of ethylene homopolymers and copolymers of ethylene and $C_3$-$C_{10}$ α-olefins provided that the ethylene content of the ethylene polymer phase is at least 8 weight %,
(b) providing a compatibilizing agent, wherein the compatibilizing agent is selected from the group consisting of 4-((4-vinylbenzyl)oxy)-2,2,6,6-tetramethylpiperidine-1-oxyl; 4,4'-((bicyclo[2.2.1]hept-5-ene-2,3-diylbis(oxy))bis(2,2,6,6-tetramethylpiperidin-1-oxyl); N-tert-Butyl-α-phenylnitrone; and mixtures thereof; and
(c) mixing the propylene polymer phase, the ethylene polymer phase and the compatibilizing agent in the presence of free carbon radicals, whereby propylene polymers are bonded to ethylene polymers by the compatibilizing agent, and whereby the propylene polymer phase and the ethylene polymer phase form a heterophasic composition.

23. The composition of claim 22, wherein the propylene polymer phase, the ethylene polymer phase and the compatibilizing agent are mixed in the presence of free carbon radicals by melt compounding, and the composition is heterophasic at 25° C.

24. The composition of claim 23, wherein the propylene polymer phase is the continuous phase and the propylene content of the propylene polymer phase is 80 weight % or greater, and the ethylene polymer phase is the discontinuous phase and the ethylene polymers are copolymers of ethylene and $C_3$-$C_{10}$ α-olefins having an ethylene content of from 8 to 80 weight %.

25. The composition of claim 22, the nitroxide radical of the compatibilizing agent has reacted with and is bonded to a propylene polymer and the unsaturated bond has reacted with and is bonded to an ethylene polymer.

26. A method of making a heterophasic polyolefin polymer composition obtained by the process comprising the steps of:
  (a) providing a propylene polymer phase comprising propylene polymers selected from the group consisting of polypropylene homopolymers and copolymers of propylene and up to 50 weight % of ethylene and/or $C_4$-$C_{10}$ α-olefins, and an ethylene polymer phase comprising ethylene polymers selected from the group consisting of ethylene homopolymers and copolymers of ethylene and $C_3$-$C_{10}$ α-olefins provided that the ethylene content of the ethylene polymer phase is at least 8 weight %,
  (b) providing a compatibilizing agent, wherein the compatibilizing agent is selected from the group consisting of 4-((4-vinylbenzyl)oxy)-2,2,6,6-tetramethylpiperidine-1-oxyl; 4,4'-((bicyclo[2.2.1]hept-5-ene-2,3-diyl-bis(oxy))bis(2,2,6,6-tetramethylpiperidin-1-oxyl); N-tert-Butyl-α-phenylnitrone; and mixtures thereof; and
  (c) mixing the propylene polymer phase, the ethylene polymer phase and the compatibilizing agent, in the presence of free carbon radicals, whereby the compatibilizing agent reacts with propylene polymers and ethylene polymers thereby bonding propylene polymers to ethylene polymers, and whereby the propylene polymer phase and the ethylene polymer phase form a heterophasic composition.

27. The method of claim 26, wherein the propylene polymer phase, the ethylene polymer phase and the compatibilizing agent are mixed in the presence of free carbon radicals by melt compounding, and the composition is heterophasic at 25° C.

28. The method of claim 27, wherein the propylene polymer phase is the continuous phase and the propylene content of the propylene polymer phase is 80 weight % or greater, and the ethylene polymer phase is the discontinuous phase and the ethylene polymers are copolymers of ethylene and $C_3$-$C_{10}$ α-olefins having an ethylene content of from 8 to 80 weight %.

29. The method of claim 27, wherein the polypropylene phase and the ethylene phase are provided to the mixture as a heterophasic impact copolymer obtained by operating in at least two polymerization stages.

30. The method of claim 27, wherein the nitroxide radical of the compatibilizing agent reacts with and is bonded to a propylene polymer and the unsaturated bond reacts with and is bonded to an ethylene polymer.

31. The method of claim 30, wherein the compatibilizing agent is present in the heterophasic polyolefin polymer composition in a concentration of from 10 ppm to 5 weight %, based on the total weight of the composition, and wherein a reaction between the unsaturated bond of the compatibilizing agent and the ethylene polymer is conducted in the presence of a free radical generator selected from the group consisting of organic peroxides incorporating one or more O—O bonds, and the compatibilizing agent and the organic peroxide are present in a molar ratio to the O—O bonds of 1:10 to 10:1.

* * * * *